(12) United States Patent
Lehr et al.

(10) Patent No.: US 7,988,927 B2
(45) Date of Patent: Aug. 2, 2011

(54) METHOD OF VARYING THE TEMPERATURE OF A TUBE BUNDLE REACTOR

(75) Inventors: Manfred Lehr, Deggendorf (DE); Josef Dachs, Deggendorf (DE); Wolfgang Schuster, Moos (DE)

(73) Assignee: MAN DWE GmbH (DE)

( * ) Notice: Subject to any disclaimer, the term of this patent is extended or adjusted under 35 U.S.C. 154(b) by 1040 days.

(21) Appl. No.: 11/782,741

(22) Filed: Jul. 25, 2007

(65) Prior Publication Data
US 2008/0023175 A1    Jan. 31, 2008

(30) Foreign Application Priority Data

Jul. 27, 2006  (DE) .......................... 10 2006 034 811

(51) Int. Cl.
*F28D 7/00*        (2006.01)
(52) U.S. Cl. ........ 422/201; 422/198; 422/197; 422/188; 422/196; 165/61; 165/107
(58) Field of Classification Search .................. None
See application file for complete search history.

(56) References Cited

U.S. PATENT DOCUMENTS 7,226,567 B1 * 6/2007 Olbert et al. .................. 422/197

FOREIGN PATENT DOCUMENTS

| DE | 1542517 | | 1/1972 |
|---|---|---|---|
| DE | 102004010383 | A1 | 5/2005 |
| DE | 102005010645 | A1 | 8/2005 |
| DE | 102004003003 | A1 | 9/2005 |
| EP | 1166865 | | 1/2002 |
| WO | 0054877 | | 9/2000 |
| WO | 2004007064 | | 1/2004 |

OTHER PUBLICATIONS

Stankiewicz, Chem.Eng.Technol. 1989, 12, pp. 113-130.*
European Search Report; Application No. EP07014486; dated Jan. 21, 2010; 4 pages.

* cited by examiner

*Primary Examiner* — Sudhakar Katakam
(74) *Attorney, Agent, or Firm* — Thomas & Karceski, P.C.

(57) ABSTRACT

A method of varying the temperature of a tube bundle reactor for catalytic gas phase reactions upon start-up and shut-down, the tube bundle reactor comprising a major reactor portion which includes a bundle of vertically disposed reactor tubes, upper and lower tubesheets tightly connected to the upper and lower ends, respectively, of the reactor tubes, and a reactor shell enclosing the tube bundle, a heat transfer medium having a melting temperature in the range of from 100° C. to 450° C. flowing around the outer surfaces of the reactor tubes during normal operation and being circulated in at least one circuit through the major reactor portion, comprising the steps: (a) varying the heat transfer medium temperature during circulation of the heat transfer medium; and (b) passing a temperature gas through the reactor tubes at least when the heat transfer medium is not yet or no longer circulated.

15 Claims, 6 Drawing Sheets

Fig. 2a
Fig. 2b
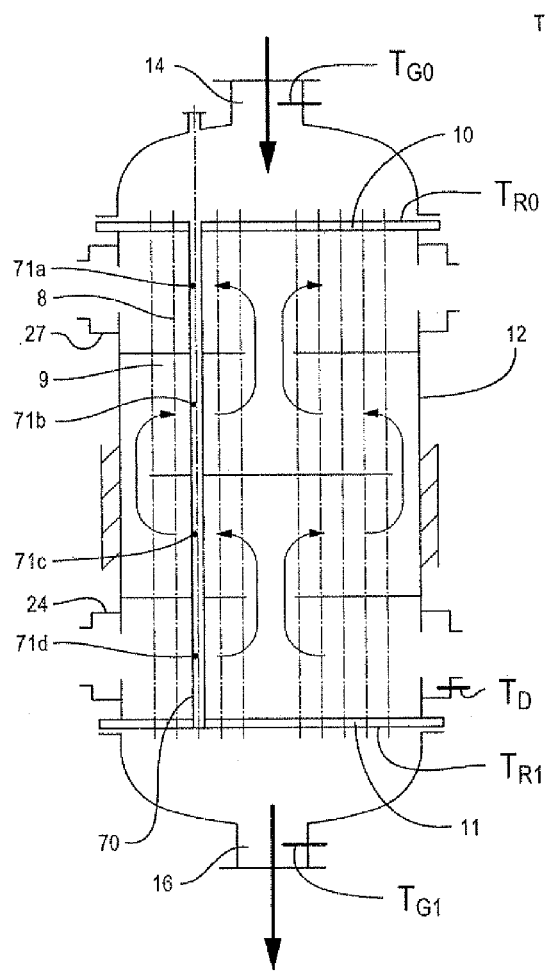
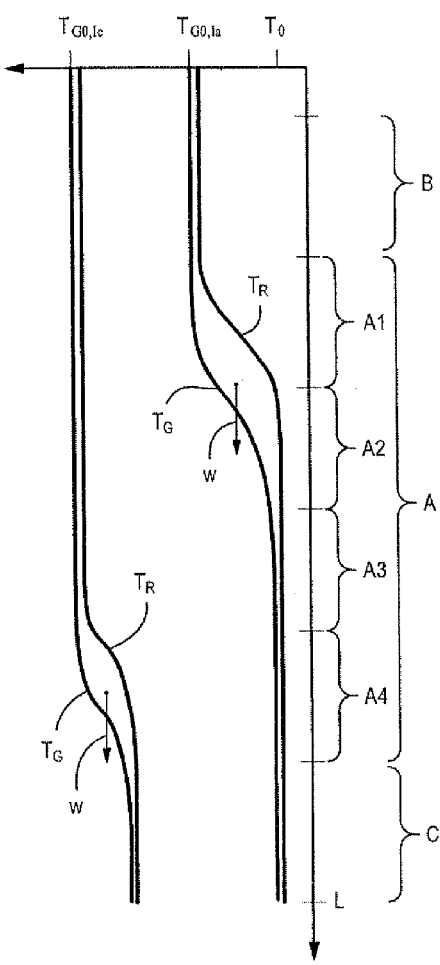

METHOD OF VARYING THE TEMPERATURE OF A TUBE BUNDLE REACTOR

FIELD OF THE INVENTION

The invention relates to a method of varying the temperature of a tube bundle reactor for catalytic gas phase reactions upon start-up and shut-down.

BACKGROUND OF THE INVENTION

In the chemical industry, catalytic gas phase processes, such as oxidation, hydrogenation, dehydrogenation, nitration, alkylation are performed successfully in tube bundle reactors comprising packed beds. Tube bundle reactors of this kind are known, for example, from DE 2 207 166 B4.

The reaction, in principle, may be either endothermic or exothermic. The packed bed, essentially a granular type catalyst, is located in a vertically positioned, generally ring-like bundle of reactor tubes which are sealed at both ends and fixed in tubesheets. The reaction gas mixture (feed gas) is supplied to the reactor tubes through a reactor head which spans the respective tubesheet, and it is likewise discharged (as a product gas mixture) through a reactor head spanning the other tubesheet. The terms reactor and tube bundle reactor will be used synonymously in the description to follow.

Stable reaction conditions are established by circulating a heat transfer medium at constant temperature by means of a pump to cool and heat, respectively, the reactor tube, followed by cooling/heating in a heat exchanger which usually is put in shunt. Inside the reactor, the heat transfer medium is guided by horizontally extending suitable baffle plates so that it flows substantially in transverse direction against the reactor tubes in the respective sections between the baffle plates and is guided axially from section to section through the reactor. Taken as a whole, therefore, the heat transfer medium flows lengthwise through the reactor. Donut-type and disc-type baffle plates have proved to be especially suitable, in particular for great tube bundle reactors which nowadays often dispose of 30,000 and more reactor tubes. For uniform reaction conditions to be obtained in the best possible way in respect of all the reactor tubes along the flow path, the mast uniform distribution of the heat transfer medium should be aimed at within each plane perpendicular to the reactor axis. In the case of WO 2004/052524 A1 that is achieved by corresponding partial stream apertures in the baffle plates. This is enhanced by a variety of other means, such as mixers, turbulence generators, or additional flow guide means. Accessories required for operation of the tube bundle reactor, such as a pump, heat exchanger, and heat-up means normally are positioned outside of the reactor shell to which they are connected directly by the shortest possible connecting lines. Thus the heat transfer medium enters the reactor shell in the vicinity of one tubesheet and leaves it in the vicinity of the other tubesheet.

As regards guidance of the flow of the heat transfer medium in the reactor system it is known, e.g. from EP 1 080 781 B1, to divide a partial stream from the heat transfer medium stream withdrawn from the reactor. The partial stream subsequently is fed into a heat exchanger and returned to the reactor by a circulating means. With a variant, the partial stream coming from the heat exchanger is supplied to an annular conduit at the heat transfer medium exit end. Such a design is disadvantageous in that either an additional circulating means is required in the heat exchanger circuit or control means must be installed in the main conduit extending parallel to the heat exchanger so that the heat transfer medium proportion flowing through the heat exchanger circuit will be adjustable. The consequence of this choice would be a stronger circulating means and thus higher investment costs.

DE 2 207 166 B4 shows an embodiment which does not require additional means in the heat transfer medium circulating system. Here, a single circulating means transports a major portion of the heat transfer medium back into the reactor as the main stream, while a smaller portion is fed as a side stream into a heat exchanger. When cooled therein, the side stream is combined with the main stream coming from the reactor and directed into the circulating means where both streams are transported further and mixed. Additionally, mixers may be provided downstream of the circulating means.

For optimum operating results, each tube bundle reactor is adapted to the respective process. In this respect, controlling the temperature along the reactor tubes is of major interest. Often it is sufficient to carry out the reaction as an isothermal process. In that event a one-zone structure is all that is needed. However, if the reaction envisaged is more complex and if a plurality of different temperature regions are required for optimum reaction control along the reactor tube it is recommendable to provide additional annular conduits, bypasses, or even a multi-zone structure which would improve influencing the temperature profile along the reactor tube. Examples for this way of proceeding are to be found in DE 2 201 528 B4, DE 28 30 765 A1, DE 698 01 797 T2, WO 2004/052526 A1, or WO 2004/067165 A1.

The selection of the heat transfer medium to be used for influencing the temperature of such gasphase processes largely depends on the particular reaction temperature. If the agent used is not one that boils at the reaction temperature but instead one which maintains its liquid state, the substances chosen should have a vapor pressure as low as possible. Liquid molten salts are widely used for such applications; they usually consist of a mixture of alkali nitrates and nitrites. For the sake of simplicity, the terms salt and salt mixtures will be used synonymously below. A preferred salt mixture consists of 53% by weight of potassium nitrate, 40% by weight of sodium nitrite, and 7% by weight of sodium nitrate. Such a mixture forms a eutectic which melts at approximately 142° C. The working temperature in general lies between 200° C. and 550° C. Reaction with oxygen and thermal decomposition reduce the nitrite content, whereas the share of nitrate increases. These processes can be delayed by superpositioning nitrogen. And if the temperature is limited to approximately 450° C. the salt practically may be regarded as being thermally stable. The melting point of the salt mixture in the equipment rises as a consequence of the decomposition process. Variations occurring in the other characteristic physical values are not remarkable and hardly have any influence on the heat transmission properties of the salt. Application, generally, is limited to a maximum of 620° C. because from this temperature on the salt reacts more strongly with iron.

As already mentioned, most of the publications on the topic of how to control the heat transfer medium are concerned with the adjustment of the optimum temperature profile. Mostly, they relate only to the steady operating condition. Only a few publications deal also with non-steady operating conditions during start-up and shut-down of the equipment.

GB 310 157 presents a heat exchanger which disposes of a bypass including a control valve which opens automatically during the start-up procedure when the heat transfer medium still is relatively cold and highly viscous, whereby a great proportion of the heat transfer medium is guided past the heat exchanger.

In general, when a heat exchanger is to be operated with liquid salt, serving as the heat transfer medium, it is preferable to melt the salt which, at the start still is in solid state, in a recipient tank. At the same time, the heat exchanger should be warmed up to a temperature higher than the melting temperature of the salt so that, when being filled into the heat exchanger, the molten salt will not cool down and solidify at once. It is likewise possible to leave the salt in the reactor itself and let it set there when the reactor is placed out of operation. In this event, renewed melting must take place from top to bottom. Moreover, there must be enough space for expansion above the solid salt surface. When it undergoes phase change and as the temperature continues to rise, the molten salt occupies an ever greater volume. With the provision described, it can expand upwardly without restriction. If it were melted from the bottom it would find no room into which to expand. In that case the expanding salt could cause undue deformation or even cracking of the surrounding walls.

Thereafter, the salt must be caused to assume operating temperature. It must be kept in mind that, just having been molten, the salt still is rather highly viscous which means that it causes great flow resistance. The following statements refer to a tube bundle reactor whose temperature is controlled by liquid salt, as an example of the kind of heat exchanger mentioned.

Preheating a reactor by passing hot gas through the reactor tubes is known in principle, e.g. from DE 1 542 517 B4 which describes a reactor where the reaction takes place in reactor tubes filled with catalyst. The rector tubes are cooled by the reaction gas entering the space inside the shell of the reactor. This reactor is equipped with an additional duct leading into the gas entry region of the reactor tubes and serving, among others, for introducing unreacted, preheated gas when the reactor is put into operation.

U.S. Pat. No. 6,046,343 is directed to dust removal from catalyst particles in reactor tubes. Part of this process resides in preventing catalyst damage caused by moisture uptake during rinsing. That is to be achieved by passing hot air through the space inside the shell of the reactor to heat the same to at least 120° C., preferably, however, to a temperature between 140° C. and 200° C. It is described in the patent that a heating alternative resides in passing hot air through the reactor tubes. Once the catalyst inside the reactor tubes has been freed from dust, nitrogen is passed through the catalyst bed for rinsing, while it is heated to starting temperature at the outside of the shell first by heated air, then by high pressure vapor, and finally by a salt bath functioning as heat transfer medium for the reaction.

German patent DE 2 062 095 B4 describes heating of a tube bundle reactor for carrying out exothermic chemical reactions, the reactor being cooled by a heat transfer medium which is not specified in detail. As the operating temperature lies between 350° C. and 450° C., the preferred heat transfer medium which suggests itself to those skilled in the art is liquid salt. It is mentioned in the publication that the system in question sometimes must be turned off and then restarted, e.g. to replace the catalyst. Upon start-up, the reaction process does not set in until after a higher temperature has been reached. That requires corresponding preheating of the tube bundle reactor. It is possible, in principle, to use an additional heat transfer medium which is passed through the reaction chamber. It is said in DE 2 062 095 B4 that vapor of sufficiently high temperature was available only rarely, whereas hot air and flue gases required a lot of expenditure in terms of heating units and accessories or led to operational deficiencies. To overcome that problem, it is suggested that a heater means connected in parallel with the given circling system of the heat transfer medium should be arranged, in addition, outside of the reaction vessel and linked to the latter by means of a combined blocking and regulating member at two places where different pressures prevailed.

EP 1 166 865 A2 reverts to and characterizes this per se known concept of preheating the reactor by passing hot temperature gas through it and subsequently introducing liquid salt into the space inside the shell. More specifically, this patent relates to a method of starting-up a tube bundle reactor designed for circulating a heat transfer medium which has a melting point in the range between 50° C. and 250° C. towards the outer surfaces of the reactor tubes. For start-up, a temperature gas having a temperature in the range between 100° C. and 400° C. is introduced into the reactor tubes, thereby raising the temperature. Subsequently the heat transfer medium is circulated in heated condition around the outer surfaces of the reactor tubes. The heat transfer medium is a salt mixture of alkali nitrates and nitrites. Further explanations given relate to the temperature of the temperature gas at the outlet from the reactor; from which temperature onwards the heat transfer medium is allowed to be filled in; continued raising of the temperature; use of the method in a multiple zone reactor; and the preparation of (meth-)acrolein and/or (meth-)acrylic acid after the reactor has been started up according to the method described above.

In EP 1 166 865 A2 an embodiment is described of a relatively small dual-zone tube bundle reactor having an internal diameter of 4,000 mm, a reactor tube length in the space inside the shell of 6,500 mm, and a number of 9,300 reactor tubes. For that particular reactor, true, the method presented may not cause damages. For larger tube bundle reactors, however, including more than 30,000 reactor tubes, having a diameter of about 8,000 mm and a length in the same order of magnitude, further aspects must be considered.

In particular, it must be kept in mind that, with such huge tube bundle reactors, it will take some time before temperature equalization has taken place between those parts of the equipment in direct contact with the heat-up medium and those at a greater distance from the same. For instance, if a reactor is at ambient temperature at the beginning of the start-up phase and hot gas having a temperature of 400° C. is fed into its reactor tubes the reactor tubes experience more expansion than the reactor shell. That may cause inadmissible thermal stress, going so far as to damage or even destroy the reactor.

In this context the heat-up rate, too, is of interest, i.e. the temperature increase per unit time. A general introduction to this topic may be gathered from the book by Klaus H. Weber entitled "Inbetriebnahme verfahrenstechnischer Anlagen", Springer-Verlag, 1997, 1st edition. The author describes the start-up of equipment as a small but important part of setting a plant into operation. The aim should be to heat all parts of the equipment as uniformly as possible so that they will not attain different temperature levels which would cause undue thermal stress. In the chapter on putting operating means systems, especially vapor and condensate systems, into operation it is stated that the heat-up rate of cold piping should be 5° C./minute at the most, which would correspond to 300° C./hour (° C./h). However, this is true only provided the pipeline is heated uniformly throughout its length. The aim is infinitely more difficult to achieve with a large tube bundle reactor where diameters may be from 6 to 8 meter and the length may be in the same order of magnitude. A start-up example is given of an overall plant where two reactors containing bulk catalyst and working in parallel are started-up at an admissible heat-up rate of 20° C./h (cf. bottom of page 309 of Inbetriebnahme verfahrenstechnischer Anlagen).

FIG. 3 of EP 1 166 865 A2 is a diagram in which the temperature curves for the two zones of a dual-zone reactor are plotted above time. From this diagram, one can gather that the temperature gas causes a heat-up rate of approximately 50° C./h.

Moreover, it is disadvantageous to continue to heat the reactor with gas when the melting temperature of the heat transfer medium has long been reached and the reactor already is filled with liquid heat transfer medium salt. Proceeding in this manner, first the gas must be heated up. In a second step, the heat must be transmitted to the inside wall of the reactor tube. Thus there are two steps of heat transmission. If, on the other hand, reactor heat-up is effected by electrical heat-up means which are directly connected to the reactor, as is the case with a reactor according to DE 2 207 166 B4, the electrical energy is transferred directly to the heat transfer medium salt, making the heat-up procedure more direct and faster. Furthermore, there are no thermal losses caused by ducts which extend between the intermediate tank, external heat-up means, and the reactor. Apart from that, EP 1 166 865 A2 does not mention any heat insulation at all. The externally located parts of the equipment, like the intermediate tank and heat-up means make it necessary to provide additional pumps. This is in contrast to DE 2 207 166 B4 according to which flow through the electrical heat-up means takes place due to its communication with locations of different pressures in the heat transfer medium circulating system, without need for an additional pump.

During normal operation between lower and upper operating points, temperature variations may occur in the heat transfer medium system and that may cause volume variations of the heat transfer medium. Such operational changes of the volume conveniently are accommodated by an expansion tank designed for volume variation. According to DE 2 207 166 B4 this problem is resolved in simple fashion in that the heat transfer medium may expand into an expansion tank connected directly to the circulating pump and cooler. The capacity of the expansion tank is exceeded when the temperature of the upper operating point is surpassed, excess volume will flow through an overflow pipe into a collecting tank or back into the recipient heat transfer medium tank. When the temperature drops below the lower operating point, the missing heat transfer medium volume is compensated by replenishing from the recipient heat transfer medium tank.

EP 1 166 865 A2, moreover, describes the heat-up process for a multiple zone reactor. Only one intermediate tank is provided for adjusting different temperatures in the various zones, and a partial amount out of that tank is fed to a separate heater. For its heat-up, this reactor system requires an expensive measuring, control, and regulating system for the volume flows and temperatures. Independent control of the volume flows and temperatures can be effected to a limited extent only. Furthermore, separate conveying means and many connecting lines are needed between the tube bundle reactor, the intermediate tank, and the heater. And they must be furnished with insulated heat tracing to limit heat losses. Nothing is mentioned about the start-up of other parts of the equipment, such as the cooler which does not begin to operate until after heat-up.

During shut-down of the reactor, in general, the problems regarding temperature differences and cooling rate are similar mutatis mutandis. But no relevant printed prior art is known.

What is known in the art, mainly are ways and means of temperature control of the heat transfer medium for steady operation. As regards known controls for non-steady temperature variations, only general ways of proceeding are mentioned.

Certain heat-up rates are given, e.g. the figure of 20° C./h quoted above from the cited book "Inbetriebnahme verfahrenstechnischer Anlagen". With them, however, a person skilled in the art does not know at what points these must be observed and, therefore, fails to know when in fact they are surpassed. Heating-up or cooling of a reactor is not an isothermal event. Instead, it varies greatly both in time and place. Hot and cold rolls, respectively, during which heating and cooling occur rush very rapidly through the reactor. While practically no heat-up or cool-off takes place in front of and behind a roll.

The problem of parts of the reactor system possibly becoming damaged by thermal expansions which differ too much when temperature differences are too great, is hardly discussed at all. Indications of how to avoid such damages are missing entirely. Moreover, start-up and shut-down of accessory units directly coupled to the tube bundle reactor are not considered in the prior art.

BRIEF SUMMARY OF THE INVENTION

The invention relates to a method of varying the temperature of a tube bundle reactor for catalytic gas phase reactions upon start-up and shut-down. The tube bundle reactor comprises a major reactor portion including a bundle of vertically disposed reactor tubes, an upper tubesheet and a lower tubesheet, the tubesheets being tightly connected to the upper and lower ends, respectively, of the reactor tubes; the tube bundle reactor further comprises a reactor shell which encloses the tube bundle, a heat transfer medium having a melting temperature in the range of from 100° C. to 450° C. flowing around the outer surfaces of the reactor tubes during normal operation and being circulated in at least one circuit through the major reactor portion. The method comprises the following steps: (a) varying the heat transfer medium temperature by means of a heat exchanger during circulation of the heat transfer medium, and (b) passing a temperature gas through the reactor tubes at least when the heat transfer medium is not yet or no longer circulated.

It is the object of the invention to limit temperature differences occurring during the non-steady periods upon start-up and shut-down of a tube bundle reactor, especially a tube bundle reactor cooled by molten salt, such that inadmissible thermal stresses are widely avoided and heating-up and cooling-down take place as rapidly as possible.

This object is met, according to the invention, with a method of the kind specified initially, in that the temperature of the temperature gas, when entering the reactor tubes, is limited upwards during start-up and downwards during shut-down and/or the volume flow of the temperature gas is limited upwards such that, for any time period which begins with the first introduction of the temperature gas, the time-average rate of change of the temperature of the temperature gas, when exiting the reactor tubes, does not exceed 30° C./h. Beyond that, advantageous variants of the method are defined in the subclaims.

The measures according to the invention make sure that undue thermal loads are avoided during start-up and shut-down of tube bundle reactors. As the thermal loads acting on the tube bundle reactor during these two procedures are essentially alike, the conditions of the method according to the invention are applicable both to heating up and cooling down.

Maintaining the time-average temperature rate of change of the temperature gas at the outlet from the reactor tubes makes sure that, when heating up and cooling down as quickly as possible, the heat-up and cool-off rates, respectively, both in longitudinal and radial directions of the reactor, are small enough to avoid undue thermal stresses. That is true also if any accessory devices are connected directly to the tube bundle reactor.

The temperature differences between parts within a reactor or the temperature differences in the media in contact with reactor parts are restricted to a level which prevents inadmissibly high thermal stresses as a consequence of excessive different temperature-induced expansions.

The temperature rate of change of the temperature gas at the outlet from the reactor tubes is influenced by way of the temperature and/or volume flow at which the temperature gas enters the reactor tubes. The entry temperature of the temperature gas as well as the volume flow are limited to an uncritical level at the beginning of the start-up or shut-down.

It is a fact that the method according to the invention unambiguously defines variables and points of measurement—temperature and/or volume flow of the temperature gas at the inlet into the reactor tubes and time-average temperature rate of change of the temperature gas at the outlet from the reactor tubes—these variables being measured either directly or indirectly. Therefore, a person skilled in the art can ascertain easily and reliably, during start-up and shut-down operations, whether he is in the safe or unsafe region as regards the thermal loads.

The method according to the invention, on the one hand, allows the reactor system to be started up and shut down quickly while, at the same time, guaranteeing that this can be achieved smoothly and safely in consideration of inadmissible thermal stresses. Subsequently, several load cycles may be run; the lifetime is prolonged. Furthermore, the mechanical outfit of the reactor system is simplified by the provision of only one expansion tank to receive heat transfer medium material as it expands with rising temperatures. A separate reservoir can be dispensed with.

The limitation of the time-average temperature rate of change of the temperature gas also permits more accurate dimensioning of the heat-up means, and that helps to save investment cost.

The method according to the invention is applicable to single and multiple zone reactors.

BRIEF DESCRIPTION OF THE SEVERAL VIEWS OF THE DRAWING(S)

The invention will be described in greater detail below with reference to the accompanying drawings, in which:

FIG. 2a is a longitudinal sectional view of the tube bundle reactor of FIG. 1, including temperature measuring points;

FIG. 2b is a graph depicting temperature curves across the length of the reactor;

DETAILED DESCRIPTION OF THE INVENTION

Figure 1:
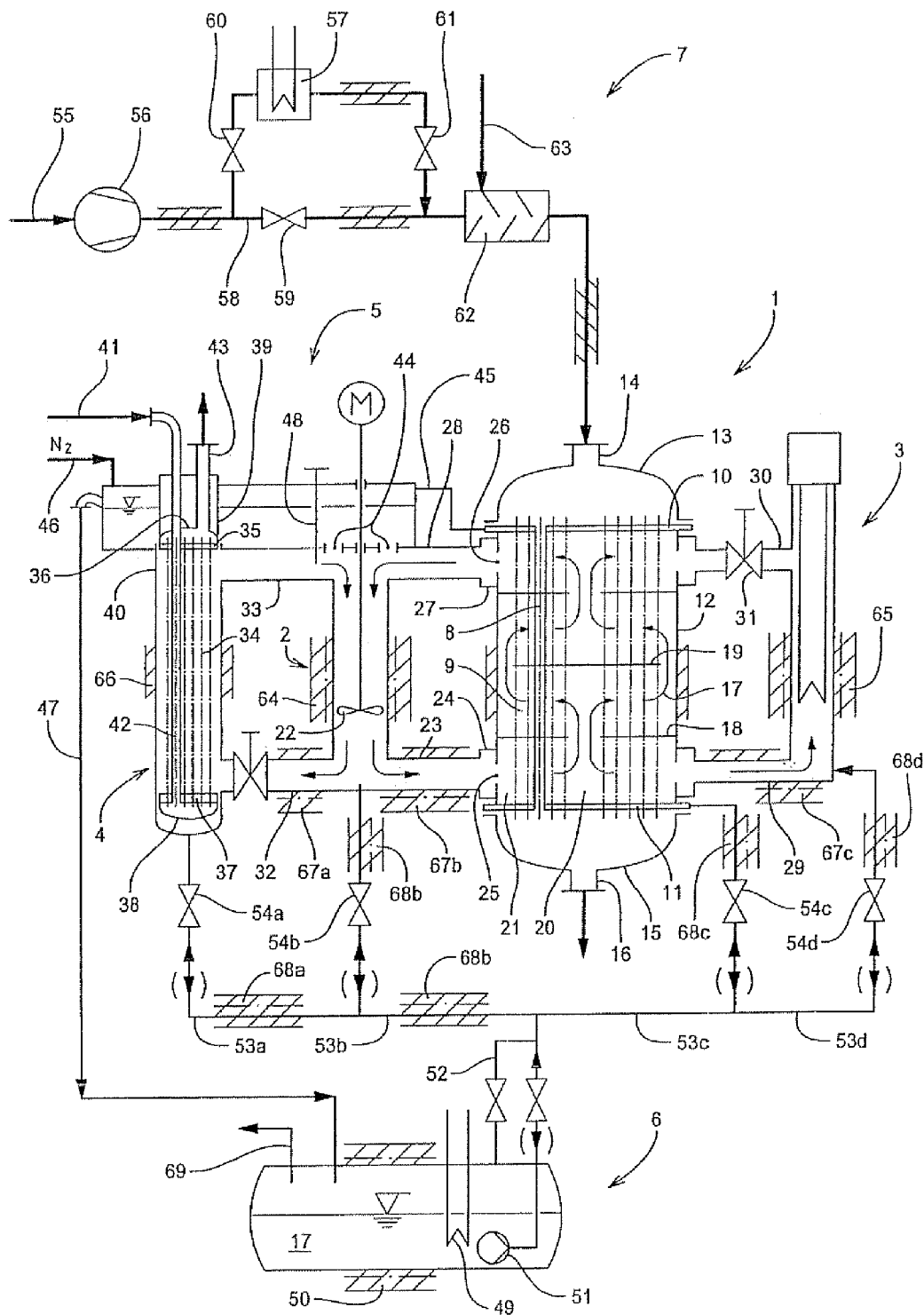
FIG. 1 is a schematic diagram in longitudinal section of a reactor system for exothermic reactions, comprising a single-zone tube bundle reactor, a circulating means, and a cooler, a first embodiment of the method according to the invention being applied to this reactor system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Fundamentally, any known reactor system may be operated according to the method of the instant invention. The method is especially well suited for catalytic exothermic or endothermic gas phase reactions, especially for those listed in claims 15 and 16. The type of process is insignificant since the method is directed to the non-steady periods during start-up and shut-down. The method according to the invention will be described in greater detail below with reference to its application to a reactor system for exothermic gas phase reactions, even though it could be applied just as well to reactor systems for endothermic gas phase reactions. The principal component parts of such a reactor system essentially are a reactor and its peripheral units. Peripheral units are to be understood as any apparatus or machinery disposed outside of the reactor proper but required for its operation, for example, circulating and conveying means, heat exchangers, more specifically a circulating means for circulating a heat transfer medium which is liquid in operation, a heat-up means for temporarily heating the reactor system, a cooler for dissipation of the heat of reaction generated in the reactor, an expansion tank, a salt tank, and a gas treatment apparatus for producing and/or controlling the temperature of a temperature gas and a reaction gas mixture, respectively.

The peripheral units may differ in structure and arrangement in accordance with aspects of engineering, process engineering, or economic considerations. It may prove necessary, especially with very large tube bundle reactors to split the performance of one or more peripheral units into two or more such units for reasons of size, weight, degree of efficiency, and better distribution of the heat transfer medium, or for other reasons. Additional flow orienting means and/or conduits may be provided, if desired.

The reactor with which the method according to the invention is realized is not restricted by any other aspects either, such as material, design details, and applications. All the component parts and particulars of construction are to be harmonized in each specific case.

The specific design of the reactor used is not restricted. For instance, rather than using a reactor which comprises a bundle of reactor tubes, a reactor having plate-like heat exchanger surfaces may be used in equivalent manner. A tube bundle reactor comprises a plurality of reactor tubes filled with catalyst and combined to form a bundle. The tube bundle usually has a circular cross section, but the cross section also may be rectangular or of any other shape. The reactor tubes terminate in sealed fashion in an upper tubesheet and in a lower tubesheet. The tube bundle is enclosed by an insulated shell connected to the upper and lower tubesheets. If desired, the shell may be provided with compensators to accommodate thermal stress. An upper head formed with a gas inlet nozzle spans the upper tubesheet and a lower head formed with a gas outlet nozzle spans the lower tubesheet.

The heat of reaction generated in the reactor tubes is carried off by a heat transfer medium which flows through the space inside the shell of the reactor. The heat transfer medium is passed through distributing channels into the tube bundle reactor. If the tube bundle reactor has a circular cross section the distributing channels normally are in the form of annular channels. To obtain good heat transfer, the heat transfer medium typically is guided in transverse direction towards the reactor tubes by a plurality of baffle plates positioned at right angles with respect to the reactor tubes. In the simplest case, these baffle plates have alternately placed openings for passage of the heat transfer medium which thus is guided from one end of the tube bundle to the other. With large reactor apparatus having diameters of several meters, however, this would lead to uneven dissipation of heat. Therefore, it is customary in this instance to provide donut-type or disc-type baffle plates to guide the heat transfer medium in meandering ways through the tube bundle. The interior within the tube bundle usually contains no tube in order to leave room for the heat transfer medium to flow radially from inside out and vice versa. A corresponding flow space is left free between the outer border of the tube bundle and the shell.

A single-zone reactor may be subdivided into three sections in terms of its functional units. The major reactor portion A comprises the reactor shell, the tube bundle, and the distributing channels connected to the shell. At one end, usually the top end, the major reactor portion A is followed by the gas inlet portion B consisting of the upper head with the gas inlet nozzle. At the other end, usually the lower end, the major reactor portion A is followed by the gas outlet portion C consisting of the lower head with the gas outlet nozzle. If the reaction gas stream should be directed from the bottom to the top the gas inlet and gas outlet portions would be exchanged accordingly.

In the description below it is assumed that the gas flows from top to bottom in the reactor. However, a gas stream in opposite direction also is conceivable. In that case the inlet and outlet ends must be exchanged accordingly.

The most critical part as regards thermal stresses is the major reactor portion A. It was found that the greatest differences in temperature exist between the upper edge of the tubesheet and the distributing channel located at the other end of the reactor. A plurality of temperature measuring points are distributed throughout the entire reactor to verify the temperature and, especially, to determine the greatest temperature differences. At the very least, temperature measuring points for the gas entering and leaving the reactor are provided in the gas inlet and outlet nozzles and also in the distributing channel for the heat transfer medium opposite the gas inlet nozzle and on the tubesheet at the entry end. Instead of taking the tubesheet temperature, the temperature which prevails in the gas inlet nozzle may be used as an alternative. The temperature difference determined by this method is somewhat greater than the difference which actually exists. That, however, is not a disadvantage because it affords greater safety.

The progressing of the temperature variation process likewise is subjected to control effected by means of at least one thermometer tube which is positioned within the tube bundle and includes at least one temperature measuring point. Usually two different types of thermometer tubes are arranged in a reactor, one of them for operative detection of the reaction gas temperature along a reactor tube and the other one for operative detection of the heat transfer medium temperature along a reactor tube. The design of such a thermometer tube may provide for a plurality of thermoelements to be disposed along the inside thereof. A measuring means of this kind is known as a "multipoint-thermoelement". The measuring signals of the thermoelements are transmitted out of the reactor by a signal cable. A protective sheath between the upper end of the thermometer tube and the reactor wall is convenient. The signal cable preferably is guided out of the reactor through a pipe end provided for this purpose. The thermometer tube for measuring the temperature of the heat transfer medium is dosed at its bottom end, and the space between the thermoelements and the inner wall of the thermometer tube is filled with a good heat conductor material, such as granular aluminum having a particle size between 0.5 mm and 2.5 mm.

A specific temperature or, if desired, a specific temperature profile along the reactor tubes is required for the majority of gas phase reactions so as to obtain optimum results in terms of yield and selectivity. That is why temperature control with the aid of a heat transfer medium which influences the temperature of the reactor tubes is particularly significant. A variety of heat transfer media are suitable for resolving that task.

The optimum temperature level of exothermic gas phase reactions almost always is rather high, if the heat of reaction is passed off to an evaporating heat transfer medium the heat transfer is extremely good. But it is disadvantageous that the temperature inside the reactor is substantially the same everywhere. That makes it impossible to adjust a temperature profile. Besides, the evaporation temperature depends on the pressure, and pressures very easily will be such as to require wall thicknesses which render the whole thing uneconomical.

As that is so, one attempts to select heat transfer media which have low vapor pressures, continue to be liquid at high temperatures, and are thermally stable. These requirements are fulfilled by a number of ionic liquids. Such ionic liquids are described in greater detail, for example, in DE 103 16 418 A1. They are suitable, in principle, for use in tube bundle reactors for exothermic gas phase reactions. But because of their high costs they are not widely used as yet.

Salt mixtures of carbonates or nitrites/nitrates exist as alternatives to be used instead of ionic liquids. These salt mixtures have the advantage of offering better thermal stability. Moreover, they are distinctly less expensive than ionic liquids—a decisive factor when it comes to large reactors which measure several meters in diameter and length. The composition of the salt may vary and the melting points differ accordingly. Any kind of salt whose melting point lies in the range mentioned above may be used, regardless of its composition. The preferred heat transfer media have a melting point in the range between 100° C. and 450° C. Especially preferred is a mixture of potassium nitrate, sodium nitrate, and sodium nitrite, preferably as a eutectic composition. This mixture is known as "HTS salt" (high temperature salt). Its melting point is about 142° C. In the instant application, the terms heat transfer medium and salt are used as synonyms.

In comparison with other kinds of heat transfer medium in use for temperature control of a chemical reaction, this salt is particularly advantageous because of its excellent thermal stability best displayed, in respect of heat transfer, by being highest at high temperatures in the range of up to 0.350° C. to 550° C.

For circulation of the salt in the reactor, the heat transfer medium should be kept at a temperature above the melting point for good flow behavior. To achieve that, the heat transfer medium preferably is heated outside of the reactor and then introduced into the reactor at elevated temperature. To prevent it from cooling, which would present a risk of the heat transfer medium solidifying, first of all the temperature thereof must be well above the melting point. Secondly, the reactor must be preheated at least to the melting temperature. Thirdly, the connecting lines must be thermally insulated and heated. Fourthly, the filling step must be carried out quickly, and fifthly, the heat transfer medium filled into the reactor must be thoroughly circulated and its temperature level maintained or raised still further by heating means. The heat-up steps performed must not elevate the heat of the reactor too rapidly so as to prevent it from becoming heated unevenly which would result in inadmissible thermal stresses. The means and method steps described below serve to accomplish the above.

A circulating means transports the heat transfer medium in a circuit through the reactor system. The circulating means normally is embodied by a circulating pump with an axial impeller conveying the heat transfer medium preferably from top to bottom in order to avoid cavitation. The heat transfer medium main stream is supplied to the reactor through a short, lower reactor feed duct. It is distributed at the reactor by a lower distributing channel. Suitably shaped, lower shell openings distribute the heat transfer medium uniformly around the reactor circumference. If the reactor cross section is circular and the heat transfer medium directed uniformly around the circumference from the outside to the inside and then again from the inside to the outside, as specified above, the shell openings are dimensioned in accordance with the flow pressure such that the heat transfer medium will be guided along the circumference uniformly through the outer shell space of the reactor. Having passed the reactor, the liquid salt will leave the reactor through upper shell openings and into an upper distributing channel, in analogy to its inward flow. An upper reactor discharge duct leads the heat transfer medium back to the entrance region of the circulating means. If the process is an exothermic one, a heat transfer medium stream will be passed in circulation through a short connecting line to a cooler. The quantity of this heat transfer medium stream is adjusted by a control valve. The cooled heat transfer medium returns through a short pipeline to the entry zone of the circulating means where it joins the main stream coming from the tube bundle reactor to flow back into the circulating means. The hot heat transfer medium stream coming from the tube bundle reactor and the cold heat transfer medium stream coming from the cooler are mixed and conveyed onwards by the circulating means. Static mixers may be arranged additionally upstream and/or downstream of the circulating means to further equalize the temperature distribution in the heat transfer medium.

Furthermore, a heat-up means for the heat transfer medium is connected to the lower and the upper distributing channels through a short heat-up means feed duct and an upper heat-up means discharge duct, respectively. The heat-up means serves to heat and maintain the temperature upon start-up of the reactor and to supply heat of reaction if the processes are endothermic. If desired, the salt stream through the heat-up means may be adjusted additionally by a control valve. The heat-up means may be operated in different manners. It may be a heat exchanger which is heated by steam, vapor or flue gas, or it may be fired. The preferred heat-up means is an electrical heat-up means, briefly "E-heater." When the circulating means is operating, a partial stream of the heat transfer medium flows to the heat-up means. After its heat-up, the hot heat transfer medium returns into the reactor. The throughput may be varied by a control valve. Practical experience has shown that this valve may be dispensed with, to no disadvantage.

Heat is dissipated through a cooler in the case of exothermic processes and for quick cooling of the reactor. There is, in principle, no restriction regarding the type of cooler used. For example, it may be a gas-cooled heat exchanger utilizing, for instance, the reaction gas or ambient air as its cooling gas, or it may be cooled by a liquid realized, for example, by a feed water preheater. Moreover, the cooler may be embodied by a superheater of vapor or steam in a vapor or steam circuit. In a preferred embodiment according to the invention, the cooler is a steam generator, i.e. heat is withdrawn from the heat transfer medium by evaporation of a liquid evaporating medium, usually being water.

The cooler, preferably, is connected via short connecting lines to the circulating means or the reactor in order to limit thermal and pressure losses. Being a steam generator; the cooler preferably comprises a bundle of evaporator tubes sealingly closed at both ends by tubesheets. The upper cooler tubesheet is enclosed by an upper cooler head, the lower cooler tubesheet by a lower cooler head. The upper cooler tubesheet is firmly connected to the expansion tank by a connector casing, the lower cooler tubesheet is freely movable in axial direction in a cooler casing. Feed water is supplied through a feed water duct which extends through the upper cooler tubesheet and opens into a lower cooler head. The heat transfer medium flows around the evaporator tubes, causing partial evaporation of the water in the evaporator tubes. Baffle plates direct the heat transfer medium transversely of the evaporator tubes so that the best possible heat transfer can be obtained. Laterally disposed alternating openings may be formed in the baffle plates, or the baffle plates may be donut-type or disc-type baffle plates.

If the production plant comprises other steam generators located nearby the water-steam mixture usually will be led into a central steam drum. The steam, freed of liquid, is utilized in a steam network; the separated water is returned into the steam generator as part of the feed water. It is advantageous to dimension the various parts of the plant so that the water-steam mixture and the feed water, respectively, will flow by natural circulation, in other words buoyancy alone suffices to attain a sufficiently high number of revolutions to avoid overheating. Separate circulating means are not required.

A steam separator device is integrated in the cooler in a preferred embodiment if a central steam drum is not worthwhile. More specifically, a cylindrical cooler casing is mounted on the upper cooler tubesheet. It is followed by an upper cooler head provided with a steam outlet nozzle. With this structure, the water-steam mixture generated in the evaporator tubes flows first into a collecting space which is closed in upward direction by a partition. The feed water is introduced through a feed water duct into the liquid space above the partition whence it flows through a cooler connecting pipe into the space in the lower cooler head. It is likewise possible to have the feed water duct extend in part directly into this space. Moreover, a sump blow-down pipe extends through this connecting pipe for sucking deposits from the floor of the lower cooler head, if required. Any floating substances that may have been entrained are discharged through a surface blow-down duct. The water-steam mixture in the collecting space rises through an aperture in the partition into a coarse separator. A preferred type of coarse separator is a cyclone separator as described in CH 515 734, for example. The steam, once separated, is freed of the finest droplets in a demister and leaves the cooler through the steam outlet nozzle. The demister may be any commercially available drop separator of appropriate size, e.g., a lamellar separator or fabric. In the context of the invention it is preferred to use stainless steel mesh. The liquid phase trickles back into the liquid space. The liquid level is measured by measuring stubs and regulated by the quantity of feed water supplied.

For economic reasons, the number of cyclone separators is kept as small as possible. The number depends on the quantity of steam, the circulating amount of water, the pressure, the number of revolutions as ratio between the mass flows of steam and water, and the optimum operative range of a cyclone separator.

Having moved through the steam generator, the cooled heat transfer medium flows back into the inlet of the circulating means. Together with the heated heat transfer medium exiting from a short outlet connecting line from the reactor, it enters the circulating means where it is moved on while being vigorously mixed with the heat transfer medium main stream.

As the temperature rises, the volume of the heat transfer medium salt increases. This additional volume escapes into an expansion tank. The size of the expansion tank depends on the magnitude of the additional volume of salt produced by the heating and on the maximum temperature. This tank need not take up the whole additional volume resulting from the temperature elevation. When the capacity limit of the expansion tank is reached, the heat transfer medium flows through an overflow pipe to a safe place having sufficient holding capacity, or it returns directly into the salt tank.

A compact structure is obtained by providing the expansion tank in the form of additional space inside the circulating means and/or the cooler or heat-up means. Several such spaces may be interconnected by a respective connecting line each for heat transfer medium and gas so as to form a single space. Fluid communication is established, at least at one point of connection, between this single space and the heat transfer medium being circulated. Degassing points at the high point or at other points of the heat transfer medium space inside the shell of the reactor may be linked to the expansion tank by conduits.

A fluid level gauge is arranged in the expansion tank so that critical fluid levels therein may be reacted to. The fluid level gauge preferably operates according to the method with which gas is bubbled in. Nitrogen is the preferred working gas. The fluid level in this instance results from the counter-pressure of the issuing gas. At the same time, the nitrogen functions as an inert gas for the salt over which, by the way, nitrogen is superimposed in the entire reactor system. If this nitrogen duct is not sufficient, an additional separate duct may be provided for nitrogen.

At certain liquid levels, appropriate measures will be released. A characteristic liquid level is the highest operational liquid level, designated "HL". When this liquid level is reached, the excess heat transfer medium flows through an overflow/emergency relief pipe end and an overflow duct downstream thereof either to a safe place offering sufficient holding capacity or back into the salt tank. Moreover, a warning may be given. If the liquid rises faster than it drains and attains level "HHL" the equipment is turned off automatically. If, on the other hand, the liquid level drops to a value below "LL" a warning will be released to call attention to the need of replenishing from the salt tank. Dropping to the minimum permissible level "LLL" causes automatic turn-off of the equipment. The "LLL" level lies above the lower edge of the upper tubesheet of the reactor.

The emergency relief pipe end enters into action not only when the heat transfer medium expands excessively but also in rather unlikely events such as, for example, a tube of an evaporation cooler bursting. Under such circumstances the water-steam mixture would be urged into the salt space where it evaporates very rapidly. The resulting mixture of water, steam, and liquid salt then may be discharged through the short pipe end which functions as emergency relief outlet.

The heat transfer medium salt, when initially filled into the salt tank, is a powder or granular material. Upon start-up of the reactor system, the salt is melted by a heater means installed inside the salt tank and/or at the outer surface thereof. The type of heating device is optional. It may be operated by vapor or steam, for instance, or electrically. Up to this point in time, the remainder of the reactor system still is free of salt and at ambient temperature. From the time when the salt is molten and in a state ready to be pumped, it may be circulated by means of a salt tank pump through a return duct in order to equalize and expedite the melting procedure. The salt tank is connected to the individual components of the reactor system by a plurality of salt connecting lines. The salt connecting lines each are equipped with a respective shut-off valve. The amount of salt needed for operation of a large tube bundle reactor may be very great, corresponding to the size of the reactor. The heater means, on the other hand, which is associated with the salt tank tends to be rather small, for economic reasons, because of its infrequent use. Consequently, melting and heating procedures may take several days.

For start-up, first, a suitable temperature gas is conveyed by a compressor or fan in a gas treatment apparatus to a gas heater located in the main stream or in a bypass of the principal gas pipeline. Control of the gas is assisted by suitable gas shut-off valves. In addition, the temperature of the temperature gas may be equalized in a gas mixer. As soon as the reactor has reached operating temperature, the reaction gas components to be reacted may be added through a supply duct to the gas stream for mutual equalization in one or more gas mixers. To begin with, however, the temperature gas flows through the gas spaces of the reactor during the heat-up process. There, the heating takes place in accordance with the conditions of the invention as laid down for temperature levels and temperature differences. When the reactor has reached a certain temperature, insulated heat tracings (i.e. tracing heaters) are put into operation at the pump casing, the heat-up means, the cooler casing, and the connecting lines among one another and to the salt tank.

All the peripheral units which are not heatable in any other way as well as their connecting lines are furnished with heated insulation. Steam is used as the preferred heating medium because usually this energy carrier is readily available from a steam network.

Filling of the reactor system with liquid salt is begun when the reactor system has been preheated to a level well above the melting temperature of the salt and the temperature of the salt in the salt tank is the salt fill-in temperature. Filling may be carried out either by way of a pump, preferably an immersion pump which is immersed in the liquid melt in the tank. The gas volume variation in the salt tank is compensated by the overflow pipe from the reactor system. Alternatively, excess gas pressure, preferably generated by nitrogen, in the gas space of the tank may be used for filling. For this alternative, the tank must be embodied by a respective pressure tank, and it must be possible to close the venting of the tank as well as the overflow pipes opening into the tank. Before filling, shut-off valves in the filling pipelines must be opened and bypasses, if any, be closed. The liquid level of the heat transfer medium in the expansion tank of the reactor is measured by the fluid level gauge during the filling procedure. If the gauge indicates a minimum filling level the feeding of salt is stopped and the salt tank pump, if in operation, is turned off. The filling pipelines may be left to empty automatically by virtue of appropriate venting apertures in the filling pipelines towards the tank. It is an absolute requirement for the accomplishment hereof that the conduits are laid at a constant gradient from the reactor system to the tank. At the same time, or offset in time, the supply of temperature gas is stopped as is the steam heat tracing, with the exception of the drain and overflow pipes. The circulating means and the heat-up means are put into operation. The previous opening of the optional shut-off valve has opened the way to the reactor for the heat transfer medium which has been duly heated by the heat-up means. The measuring principle by which the fluid level gauge works, preferably, is the method of gas being bubbled in. With this method, inert gas, preferably nitrogen in consideration of the salt used here, is bubbled into the salt and the level of the liquid salt is determined based on the pressure difference. At the same time, the gas space above the liquid salt is filled with nitrogen to counteract any signs of decomposition of the salt. If another measuring principle is selected the nitrogen also may be supplied through one or more separate nitrogen ducts.

The method can be applied to advantage also to multiple zone reactors having a shell space which is divided by at least one partition into at least two shell spaces. A shell space of such a reactor will be referred to below as "zone", and the reactor which comprises at least two such zones accordingly will be called "multiple zone" reactor. In a multiple zone reactor of this type different temperatures may be set in each zone, whereby optimum adjustability is offered for the conditions of a reaction. For example, multiple zone reactors are used for reactions which require undelayed cooling of the reaction gas mixture to prohibit undesired continued reaction or the formation of by-products. In those cases the final part of the reactor tubes is specifically cooled by a heat transfer medium at low temperature. To do that, either a cooled partial stream is branched off from the main circulation or a separate heat transfer medium circuit is provided. It is also possible to connect a separate aftercooler unit having its own tube bundle. Such functional separation allows the aftercooler to be optimally designed for its particular task. For instance, the cooler tubes may have other diameters and/or other spacings between tubes, or there may be tubes also inside the tube bundle, and heat transfer medium may flow transversely once or repeatedly through the cooler as a whole from one end to the other. That would allow higher flow velocities of the heat transfer medium and thus further improve heat transfer. With such an embodiment, the distributing channel and the collecting channel, respectively, would not be annular channels but instead be implemented as distributor boxes covering only part of the circumference of the aftercooler.

Of course, other functional units likewise may be connected to the major reactor portion A, such as post-reactors, or functional units may be connected upstream of the major reactor portion A, such as pre-heaters. If these functional units are connected without any intermediate piping to the major reactor portion A, irrespective of whether the connections are releasable or welded, the method conditions according to the invention must be observed mutatis mutandis for the whole compound of functional units rather than the major reactor portion A alone.

The major reactor portion A is preceded by the gas inlet portion B. In the instant case, with the reaction gas being passed from top to bottom, it consists of an upper reactor head provided with a gas inlet nozzle. The reactor head is connected releasably or by welding to the major reactor portion A. In similar manner, a gas outlet portion C consisting of a lower reactor head provided with a gas outlet nozzle is connected releasably or by welding to the major reactor portion A.

With a view to offering the greatest possible degree of freedom in adjusting a desired temperature profile or in structural designing, the kind of reactor is not specifically limited. In the simplest case each zone disposes of its own circulating means, its own cooler, and its own heat-up means. This arrangement offers the widest range of possibilities to adjust certain temperatures for each zone. Free choice, however, makes things quite complex and expensive.

It should be noted that not every shell space of a multiple zone reactor must be a reaction zone. A zone, if embodied by a preheater or cooler, also may serve merely for varying the temperature of the reaction gas, or a zone may not be cooled at all, serving merely as an adiabatic step in the reaction.

As for the embodiment of each peripheral unit required for operation of such a multiple zone reactor, the above descriptions of the single zone reactor system are applicable. The arrangement of the units may differ, depending on aspects of structural design or process engineering or on economic considerations. For example, a heat-up means, a cooler, a circulating means, or a combination thereof may be dispensed with in one or more zones. On the other hand, for example, two or more heat-up means, coolers, circulating means or combinations thereof may be associated with one zone. In both cases connecting lines with appropriate shut-off and control valves must be provided and adapted to the particular system.

The heat transfer medium conveyed from one zone to the other must be returned through yet another connection. That connection may be provided by a common cooler, by a second duct adapted to be closed, or by a so-called balancing conduit between the expansion tanks of both zones.

A connecting line adapted to be closed between two zones and preferably linked to two points where the pressure difference is greatest permits great amounts of heat to be exchanged between the zones during heating and cooling by heat transfer medium circulation, but also under exceptional process conditions.

In any case, it must be made sure that the liquid salt, when being filled in, can rise from the bottom to the top from one zone to the next, and that the connecting lines between zones can be blocked, above all for work with normal reactions.

For endothermic reactions, the method of the invention is carried out accordingly in single or multiple zone reactors. The heat of reaction which needs to be supplied is generated separately, e.g. by suitably dimensioned heat-up means, or use is made of process heat derived from other parts of the equipment. The above explanations apply also to the design of the individual components of the reactor system. A cooler actually is not needed during steady operation, but it is helpful when a low temperature level must be adjusted or the reactor be shut down because, with a cooler, the cooling period can be kept within reasonable limits. This is at the user's discretion.

Cooling takes place in the same stepwise manner as with the exothermic process, provided the corresponding parts of equipment are available.

The temperature variations provided by the method according to the invention specifically relate to heating up during start-up and cooling down during shut-down of a tube bundle reactor. These non-steady states must not be considered in isolation. Instead, they should be seen in the overall context of a plant being put into operation and placed out of operation. In the framework of these procedural steps a great number of individual measures must be observed. To begin with, the procedures taken during start-up of the reaction system by means of the method according to the invention will be described.

As part of the initial putting into operation procedure, it is suggested that start-up and shut-down of the reactor be performed at least once prior to the putting into operation proper. This is referred to as a "hot test". It differs from the operational start-up in that it is accompanied by elevating the heat transfer medium temperature to just below the design temperature. Therefore, this is a first load test for checking the entire system. In particular, the strength and tightness of the tube weldings is verified to make sure that the reactor has no salt leaks.

Moreover, the operating staff becomes acquainted with handling and manipulating the reactor system. For safety reasons, the hot test often is carried out without catalyst fillings in the reactor tubes and without the supply of reaction gas so that any salt which may yet escape will not cause unnecessary damage. The respective decision must be taken in agreement with the manufacturer of the catalyst and the licensor of the method, respectively. Nevertheless, it is also possible to use simpler replacement sealings for this operational event.

The hot test comprises the steps as listed which will be specified in greater detail below:

1. Procedures before the first putting into operation.
2. Preheating the reactor system to the fill-in temperature of salt.
3. Filling the reactor system with salt.
4. Heating the reactor system to the testing temperature.
5. Performing the hot test.
6. Cooling from hot test temperature down to the emptying temperature of salt.
7. Emptying the salt into the salt tank,
8. Cooling the reactor system to ambient temperature.

After the hot test, catalyst is filled into the reactor tubes, if desired, and the reactor system is started once more in accordance with the method of the invention. After the production period, the reactor system is shut-down by applying the method according to the invention.

With normal operation, start-up and shut-down comprise the steps listed below, assuming that before starting there is salt exclusively in the salt tank (rather than in the reactor). These steps, too, will be explained in greater detail below.

9. Heating the reactor system to operating temperature.
10. Starting up and carrying out the process.
11. Closing down the reaction and keeping warm the reactor.
12. Shutting down the reactor.

If there should be salt in the reactor before the start some differences must be observed, as will be explained below.

The individual process steps now will be described. Each step builds up where the previous one left off.

Hot Test:

Prior to the initial start-up of the reactor system, a "hot test" is performed to verify that the salt end of the reactor is perfectly sealed, especially so the tube weldings to make sure that after cooling the reactor will be free of salt leaks. This is done also to familiarize the operating staff with the handling of the reactor system.

1. Procedures Before the First Putting into Operation.

Rinsing the Entire Salt Space

The shell end must be rinsed because the formation of condensation water during shipment and installation cannot be totally avoided, especially not during seasons when humidity is high. If the tightness of the shell end, instead of being subjected to an air pressure test, was tested by a water pressure test with processing water after the installation was completed the same water may be used for rinsing. It is recommended to add 0.5% by weight of Na3PO4. The water temperature should be maintained above the dew point of air in order to avoid condensation of steam at the tube end. The water temperature can be raised slowly to 60-80° C. by blowing hot air into the reactor tubes or switching on the electrical heat-up means. The pumps must run for about twelve hours. Thereafter, the shell end must be drained and rinsed once more for about two hours with demineralized water. It is recommended to drain and rinse once again. During each rinsing course care must be taken that there is enough water at the shell end (at least up to "minimum level" in the pump casings). When the water has been drained, the shell end is to be dried with hot air and subsequently flushed with inert gas.

Cleaning/Removing Rust from the Tube End

If the tubes were delivered clean no special cleaning is required.

Melting Salt in the Salt Tank

It must be assured that the salt used meets the minimum requirements of the manufacturer's specification so as to avoid damages in the reactor.

2. Preheating the Reactor System to the Fill-in Temperature of Salt.

Preparation

Reactor system fully assembled; suitable replacement seals may be used during the hot test.

Necessary pipelines connected to the upper and lower reactor heads, remaining openings closed.

Functions of the individual component parts checked previously.

Sealing test of the shell end completed.

Air fan ready for operation.

Air preheater ready for operation.

Supply means for temperature controlling ready to operate.

Instrumentation at gas and salt ends installed and ready to operate.

Level measuring stub and other stubs not connected to pipelines at salt end sealed to avoid salt from being sputtered during filling.

Temperature gas exit from reactor to a safe place.

Reactor tubes filled with catalyst and/or inert material; clarify with catalyst manufacturer and process licensor whether catalyst already might be in the reactor during the hot test or whether the reactor tubes should be left empty to protect the catalyst.

Salt tank filled with salt whose quality at least meets the manufacturer's specification to avoid damaging the reactor.

Salt tank filled with salt preheated to operating temperature (approximately 200° C.).

No heat transfer medium salt in the reactor system.

Cooler mounted and ready for operation.

Control valve for heat transfer medium calibrated and ready to operate.

Circulating pump including drive motors installed, but not in operation.

Preheater for heat transfer medium ready for operation, but not operating.

All salt pipelines (fill/blow-down (drain), overflow, vent) installed and connected ready for operation.

All thermoelements, especially those in the upper and lower distributing channels for the heat transfer medium and in the upper and lower heads ready to operate.

All steam heat tracing for apparatus and pipelines connected and ready for operation.

Reactor and pipelines carrying heat transfer medium fully insulated.

Shut-off valves at the salt end in the salt fill and blow-down (drain) pipelines closed.

Shut-off valves for start-up steam associated with heat tracing closed.

Realization

If liquid salt or a liquid salt mixture has been selected as heat transfer medium the reactor must be preheated, prior to filling in the salt melt, to a temperature which is well above the melting temperature of the salt so that the salt will not immediately become solid again. That is why hot temperature gas is passed through the reactor.

There are no particular restrictions regarding the type of temperature gas selected, as long as it does not damage a catalyst which might be inside the reactor tubes. Suitable gases especially are vapor, steam, inert gas, air, flue gas, and unreacted, partly reacted, or fully reacted reaction gas which is circulated at least in part. The preferred temperature gas is heated air since this is a gas which is readily available, pure after optional filtering, and does not cause problems. If desired, it may also be circulated. The hot temperature gas is obtained e.g. by producing air by means of a gas compressor and gas preheater and introducing it into the reactor.

The temperature gas may be guided either through the reactor tubes or through the shell space of the reactor. Passing the temperature gas through the shell space of the reactor has the advantage that the flow of temperature gas will spread throughout the shell space. The shell space has a greater volume and greater heat transfer surface than the reactor tubes. But it is a disadvantage that the heat transfer medium, being a gas, has different flow characteristics than a liquid heat transfer medium, like liquid salt. The temperature gas looks for flow paths which offer the least flow resistance and takes a detour around parts of the reactor in the bypass. For this reason it is often difficult to obtain uniform preheating. Besides, apertures would have to be offered in the shell space which would have to be closed again subsequent to the preheating. Considering the hazardous nature of liquid salt, however, the fundamental aim is to construct the salt space without seals, as a welded structure.

Undefined and uneven heating during the flow of temperature gas through the shell space is voided if the temperature gas is passed through the reactor tubes of the tube bundle. Thereby, the tubes are heated continuously from entry to exit. The heated tubes in turn heat the surrounding gas in the shell space. As the heated gas has low density it will rise to the top. This phenomenon, known as convection, causes the gas to circulate in the shell space, thereby transmitting the heat to other places.

The places of the reactor which are the latest to be heated, of course, are exposed locations such as the distributing channels for the heat transfer medium. With tube bundle reactors where the heat transfer medium is supplied to the shell space of the reactor from the circumference, the distributing channels are annular conduits. They distribute the heat transfer medium around the circumference of the reactor where passage openings of appropriate dimensions in the shell will direct the heat transfer medium uniformly into the shell space. The distributing channels experience temperature variation in the first place due to heat conduction originating from the reactor shell. As described above, the reactor shell itself is heated by natural convection of the gas within the shell space and by heat radiation. Since the annular channels are heated unevenly, natural convection of the gas contained in them occurs there as well. This, in turn, contributes to temperature equalization.

As explained, it is possible and makes sense in some cases to heat the reactor by passing temperature gas through the shell end of the reactor. Generally, however, it is preferred to pass the temperature gas through the reactor tubes. That has the further advantage that the temperature gas also may be used as cooling gas during shut-down of the reactor. This would not be possible otherwise because the shell space still would be filled with the heat transfer medium.

The direction of flow of the temperature gas is not specifically limited. The gas may be guided from top to bottom or vice versa through the tubes of the tube bundle reactor. If it is desirable that the salt should remain and solidify in the reactor after shut-down of the reactor then it is indispensable, for the renewed start of the reactor accompanied by melting of the solid salt inside the shell space, that the temperature gas be guided from top to bottom through the tubes of the reactor in order for the molten salt to be able to expand freely in upward direction without being impeded. If the temperature gas were introduced from below into the reactor tubes the salt which would begin to melt at the bottom would have nowhere to expand to and would cause damages in the reactor.

That is why, with a preferred embodiment of the invention, the temperature gas in principle is introduced into the upper reactor head whence it is distributed to the reactor tube bundle, flows through the reactor tubes, reaches the lower reactor head, and flows out of the same through a gas outlet nozzle.

During normal operation, there are temperature differences within the reactor. The upper reactor head, being the top part of the reactor, has approximately the same temperature as the reaction gas mixture which enters there. In the major reactor portion consisting essentially of the reactor shell, the tube bundle, and the tubesheets with the distributing channels connected to them, as a rule, the temperature is much higher.

On the whole, however, the temperature differences within the major reactor portion are limited to a small amount by the heat transfer medium flowing through the same. The reasons for this quick temperature balancing are, first of all, the great thermal capacity of the heat transfer medium and secondly the good heat transfer between the heat transfer medium and the reactor, thanks to the suitably chosen flow velocity. The different expansions due to different temperatures between the upper reactor head and the major reactor portion are not critical because they are accommodated by various structural measures, such as separation by means of flanges or elastic deformation of the upper head.

Differences in temperature inside the reactor occur especially during start-up. They can be compensated only slowly because either the heat transfer medium has not yet been filled in or, if present in the shell space, needs a certain period of time itself before it is molten and so that it can contribute to equalizing the temperature.

For economic reasons, the aim generally is to start-up the reactor and bring it to hot test temperature and operating temperature, respectively, as fast as possible. If hot temperature gas is introduced into the reactor while it still is at ambient temperature this results in temperature differences within the major reactor portion since the parts of the reactor which are the first to come into contact with the gas are heated more than those at the exit from the reactor where the temperature gas already has passed off a great portion of its heat. Such differences in temperature lead to different expansions of material inside the reactor and ultimately cause thermal stresses. By virtue of appropriate structural measures taken, the temperature differentials between the principal component parts of the major reactor portion A, the gas inlet portion B, and the gas outlet portion C, in general, are not critical.

The most critical time period is during the heat-up process before any heat transfer medium circulates and hot temperature gas is introduced into the major reactor portion A. The temperature difference is greatest in the major reactor portion between the upper edge of the tubesheet at the gas inlet end and the outer end of the annular channel located at the other end of the reactor.

Surprisingly, it was found that the heat-up takes place especially uniformly and the risk of inadmissible thermal stresses can be almost excluded if, according to the invention, the temperature of the temperature gas, when entering the reactor tubes upon start-up, and/or the volume flow of the temperature gas are limited upwards such that, for any time period beginning with the first introduction of the temperature gas, the time-average rate of change of the temperature of the temperature gas, when exiting the reactor tubes, is 30° C./h at most.

With a preferred embodiment of the invention, the time-average temperature rate of change of the temperature gas, as it leaves the reactor tubes, is 20° C./h at most, especially preferred being at most 10° C./h.

Characteristic temperatures are taken at temperature measuring points located at least in the gas inlet region, including the gas inlet nozzle and the gas inlet head, and in the gas outlet region, including the gas outlet nozzle and the gas outlet head, and in the distributing channel at the end opposite the gas inlet end.

It is of advantage if the difference between the temperature of the temperature gas as it enters the reactor tubes and the temperature of the tubesheet at the entry end, at any point in time, is less than 150° C., preferably less than 100° C., especially preferred being less than 70° C.

More temperatures may be taken in axial direction in at least one thermometer tube disposed within the tube bundle.

The temperature of the temperature gas, as it exits the reactor tubes, preferably is measured directly.

Preferably, the gas inlet temperature is not increased until the temperatures begin to rise at all measuring points.

With all the procedures described above, it is important to proceed very carefully and to constantly monitor the temperatures in the reactor system so as to avoid excessive thermal stresses. If the maximum predetermined time-average rate of change of the temperature of the temperature gas, when exiting the reactor tubes, is exceeded—the rate of change being averaged over a time period beginning with the first introduction of temperature gas—this rate of change must be reduced by reducing the gas flow rate and/or the gas temperature.

Circulation of the heat transfer medium should not be started until the lowest temperature in the major reactor portion lies at least above the melting temperature of the heat transfer medium and the average temperature of the major reactor portion lies at least 20° C., preferably at least 40° C., especially preferred being at least 65° C. above the melting temperature of the heat transfer medium.

Heat Tracing

With another preferred modification of the invention all the units attached to the tube bundle reactor, such as the circulating pump, heat exchanger, and electrical heat-up means as well as all the ducts either carrying heat transfer medium or being connected to the heat transfer medium end, such as connecting lines, fill and blow-down (drain) pipelines, degassing ducts, and overflow pipes are heated by insulated heat tracing means if an alternative heating facility does not exist. The temperature of the heat tracing should be at least 160° C., preferably at least 180° C., very much preferred being at least 220° C. but not more than 250° C.

The heat tracing preferably works with saturated steam. Instead of steam heating, other heating systems may be chosen, for example, electrical heat tracing. Safety regulations against explosion must be observed in this context Salt Bath Cooler If a saturated steam generator is used as salt bath cooler it is heated simultaneously with the heat tracing means by introducing steam into the saturated steam generator at a pressure of between 15 and 25 bara. The resulting condensate is withdrawn through a pipe end at the bottom.

Peripheral Units

In an advantageous modification of the invention the peripheral units firmly connected to the major reactor portion, for instance, the casings of the pump and of the heat-up means as well as the heat exchanger are heated as soon as the tube bundle reactor has reached an average temperature between inlet and outlet and between the tubesheets at the inlet and outlet ends, respectively, which lies between 65° C. and 95° C., preferably between 70° C. and 90° C., especially preferred being between 75° C. and 85° C. Heat-up rates of up to 50° C./h are admissible values for the mean heat-up rate of peripheral units, provided stability calculations in respect of external forces and thermal stresses permit.

3. Filling the Reactor System with Salt

In accordance with the invention, the salt tank pump begins to transport liquid salt into the reactor system and the valves controlling the fill/blow-down or drain pipelines towards the reactor are opened as soon as, first, the salt in the salt tank has reached a minimum temperature of 200° C., second, the temperature at the lower annular channel of the reactor has reached a temperature of at least 180° C. by being heated with the temperature gas and, third, all peripheral units, and especially the circulating means, the cooler, heat-up means and all pipelines for filling and emptying have been heated to at least 180° C. by heat tracing. The liquid salt is added at a plurality of places of the reactor system through a plurality of heated and insulated fill/blow-down pipelines. The connections of the fill/blow-down pipelines preferably are located in the vicinity of the low points of the reactor shell space, of the circulating pump, of the salt bath cooler, and of the electrical heat-up means. It is likewise possible to provide the point of connection at the connecting lines which lead to these low points. Pumping is continued until the minimum salt filling level has been reached ("low salt level"). The feeding of hot temperature gas through the reactor and the heat tracing for pipelines carrying heat transfer medium remain in operation for the whole period of this procedure. When the level monitoring gauge indicates that the minimum filling level is reached, the filling valves are closed and the salt tank pump is turned off. Alternatively, the filling may be accomplished without a tank pump but instead by positive gas pressure in the salt tank.

While the temperature of the salt in the salt tank at the beginning of the salt transportation process is fixed at about 200° C., the temperature of the salt when it enters the reactor depends on the temperature of the heat tracing of the fill pipelines and the heat losses along the fill pipeline. The temperature range, therefore, may be indicated as being between 180° C. and 200° C.

When the salt has been filled in, nitrogen is superimposed over the salt in all the gas spaces above it.

During the salt filling procedure, the saturated steam generator preferably is pressurized and not flooded, in other words, there is no boiler feed water in the cooler.

4. Heating the Reactor System to the Testing Temperature.

When the reactor has been filled with liquid salt to the minimum filling level, the minimum temperature at all points of the reactor is 180° C., the fill pipelines have been closed, and the salt tank pump placed out of operation, the salt circulation pump and the heat-up means are switched on. The reactor system is heated to the desired temperature. During the hot test the desired temperature is a testing temperature somewhat lower than the design temperature of the reactor. Often it is in the range between 370° C. and 400° C., but it may be as high as 450° C. in individual cases.

The heating elements of the electrical heat-up means, as a rule, are divided into several heating groups to permit stepwise increasing of the heating power, or they are equipped with power dividers for stepless adjustment of the heating power.

Due to the fact that the electrical heat-up means can heat the salt much more effectively, the temperature gas is placed out of operation by switching off the air compressor or fan and the air preheater. The shut-off valve in the temperature gas pipeline is closed. The stubs and pipelines for overflowing salt, especially the emergency blow-down or drain pipe, the vent, and salt feed duct of the electrical heat-up means continue to be heated. The other heat tracing means of the peripheral units are taken out of operation, as is the temperature gas.

The salt volume grows as the temperature rises. Excess salt flows through the overflow pipe from the expansion tank to the salt tank. When the heat-up process is completed, the salt tank will not be needed any longer during normal production operation. Yet, normally, its heating is continued in order for overflowing salt not to solidify at once when it gets into the salt tank. Moreover, if the salt becomes solid in the salt tank it may cause damage in the tank as it may absorb moisture. This must be taken into account in the design of the salt tank. Alternatively, a smaller salt tank may be interposed which is heated constantly and capable of coping readily with the expected variations of the salt level.

Saturated Steam Generator

When the salt has reached a temperature of about 220° C., feed water is filled into the saturated steam generator. The control valve for salt supply first is adjusted to approximately 2-3%. As soon as the cooler has reached its operating temperature, the control valve is set to minimum throughput. In this manner it is assured, on the one hand, that the feed water will be heated and, on the other hand, that evaporation will not set in which would withdraw heat from the salt. The control valve may be closed completely when the operative saturated steam pressure has been attained.

5. Performing the Hot Test.

When the desired temperature for the hot test has been reached, the power of the electrical heat-up means is reduced by turning off heater groups in order merely to compensate heat losses during the hold period.

The desired temperature should be kept for at least 4 hours. During this hold period the desired temperature is controlled by the power of the electrical heat-up means, and the functioning and tightness of the reactor system are tested.

6. Cooling from Hot Test Temperature Down to the Emptying Temperature of Salt.

At the end of the hold period, the salt circulating pump is operating, the heat-up means only balances the heat losses, the salt overflow and vent pipes alone are subject to steam heating, the shut-off valves in the fill pipelines are closed.

Cooling is initiated by placing the heat-up means out of operation and putting the salt cooler into operation. If the latter is embodied by a saturated steam generator an upstream control valve of the same is opened slowly, and salt will flow to the shell space of the saturated steam generator. The water contained in the tubes thereof partly evaporates and the resulting water-steam mixture rises and is separated by a steam separator. The steam is directed into the steam system, the water is returned to the steam generator. The evaporated water must be substituted by a corresponding amount of boiler feed water in order to prevent the generator from running dry and overheating.

The salt volume diminishes during the cooling process. The salt level is monitored constantly by measuring the level. The salt tank pump will start to operate even before the minimum level is reached so as to replace the reduced and missing salt volume, respectively, by feeding liquid salt from the salt tank. Corresponding valves in the fill pipelines are opened for that purpose. Cooling is continued until the salt has reached a temperature for its emptying of approximately 220° C. The cooling rates are not limited during cooling with ongoing salt circulation.

7. Emptying the Salt into the Salt Tank.

At the end of the cooling process down to the salt emptying temperature of preferably about 220° C. the air compressor or fan and the air preheater still are out of operation, if desired. The salt circulating pump and the salt bath cooler are still operating.

In principle, the salt may be emptied at any temperature which is admissible for the reactor. But the salt tank must be designed accordingly.

Cooling by means of the salt bath tank and with ongoing salt circulation is the quickest and smoothest way for the reactor system because the heat transfer is best with salt being circulated, both from the reactor to the salt and from the salt to the salt bath cooler.

Before beginning with the emptying, it is absolutely necessary to check whether the heat tracing means of the blow-down and vent pipelines and of the salt tank are operating to ensure unobstructed draining or blowing down.

Emptying is initiated by turning off the salt tank pump. That is followed immediately by opening of the salt emptying valves of the reactor system. The heating means of the salt tank is operating. That prevents the salt from becoming solid in the reactor.

8. Cooling the Reactor System to Ambient Temperature.

The reactor system may be cooled to ambient temperature by natural radiation or by blowing temperature gas into the reactor tubes. The kind of cooling gas to be used is determined by the catalyst manufacturer or by the licensor of the method.

Salt is completely removed from the reactor and the units attached to the reactor were taken out of operation as the procedure of cooling to ambient temperature begins. The steam generator, in particular, is expanded to ambient pressure. Evaporation of the water in the steam generator cools it to approximately 100° C., thereafter the water is drained and blown out, respectively.

Next, the cooling proper sets in by the use of cooling gas. The conditions of the method according to the invention must be followed in order for the cooling to be uniform and also to exclude any risk of creating undue thermal stresses. Accordingly, care must be taken to make sure that the temperature of the temperature gas as it enters the reactor tubes during shutdown is limited downwards and/or the volume flow of the temperature gas is limited upwards such that for any time period which begins with the first introduction of the temperature gas, the time-average temperature rate of change of the temperature gas, when exiting the reactor tubes, does not exceed 30° C./h.

That might require the cooling gas to be heated accordingly by the air heater.

Preferably, the gas temperature is not lowered by reducing the heating power of the air heater until the temperatures begin to drop at all measuring points. The cooling rate at most should be 30° C./h, preferably at most 20° C./h, the most preferred being 10° C./h at most.

It is important with all the procedures described to act with great care and monitor the temperatures in the reactor system at all times so as to prevent undue thermal stresses. If the maximum admissible time-average temperature rate of change of the temperature gas as it leaves the reactor tubes is exceeded—the rate of change of the temperature of the temperature gas being averaged over a period of time which begins with the first introduction of temperature gas—the gas temperature must be increased and, perhaps, the gas flow rate must be decreased in addition.

Cooling of the reactor system lasts only until the temperature in the reactor system has reached the minimum fan outlet temperature. Thereafter, the fan is turned off.

Further cooling by natural heat radiation is possible. Some of the stubs in both heads may be opened to expedite the cooling.

When the reactor system has approximately reached ambient temperature, the heads or manholes in the heads are opened and tube connecting weldings at the tubesheets are examined for possible leaks and further inspections carried out.

Normal Operation, Salt in Salt Tank Before Start:

The method steps to be described next relate to the start-up and shut-down procedures of the tube bundle reactor after at least one hot test has been performed and salt, as heat transfer medium, was returned into the salt tank. All the reactor components are duly connected and ready to operate.

9. Heating the Reactor System to Operating Temperature.

The method steps to be taken for heating the reactor to the operative state for normal operation at the desired temperature are exactly identical with those taken for the hot test. The desired temperature, now, is not the test temperature but instead the normal operating temperature of the process. The desired temperature having been reached, it may be necessary to tighten all main flange connecting screws and also the stuffing boxes of the thermoelements. Then the reactor is ready to be started.

10. Starting Up and Carrying Out the Process.

When the start-up temperature has been attained, the process is started on the basis of operational experience and as agreed with the licensor.

A salt bath cooler is provided for passing off process heat. The structural type of cooler may vary, depending on the particular process and on marginal conditions. If relatively little process heat is generated simple structures may be chosen, embodied for example by an air cooler which may be put to use for preheating feed gas, for instance. Or the heat withdrawn may be dissipated to the surroundings.

If considerable amounts of heat result from reactor operation they are frequently used for generating saturated steam in steam generators since that steam may become useful at other places in the production plant. The salt bath cooler should be put into operation at a low level even before the reaction starts. Simultaneously, the heat withdrawn must be introduced by the heat-up means into the heat transfer medium. As a rule, the reaction is started up by stepwise increasing of the flow rate and/or concentration. As the reaction begins to run, the heat-up means is taken out of operation to the extent that the reaction generates heat. When the reaction is running and the heat-up means placed out of operation the amount of heat transfer medium is increased by the saturated steam generator in correspondence with the growing amount of heat by means of a control valve. Also, the feed water is replenished to make up for the evaporated water quantity. Finally, constant operating conditions will be reached due to the setting of a desired temperature value for the salt bath.

Considerations similar to those for the reactor apply to the saturated steam generator, too. This means that the saturated steam generator must be heated before it is put into operation. The way to do that was described in one of the sections above which deals with heating of the reactor to salt bath temperature. Just like the saturated steam generator itself, the feed water also may be preheated. A feed water preheater, for example, may be used for that purpose.

The latter may be arranged in the salt circulating circuit as well. The feed water should be preheated to at least 100° C.

The heat transfer medium is circulated by the circulating means. Transportation of the circulating means preferably is directed downwards so that cavitation can be prevented and expensive structural counter-measures be avoided. A main stream is directed to the tube bundle reactor, while a smaller side stream passes to a cooler which may be embodied by a gas-cooled or liquid-cooled heat exchanger or may operate as an evaporation cooler, as described above. Other embodiments, too, may be used. For example, the cooler may be a feed water preheater if only little heat is developed in the reactor. After having run through the cooler, the heat transfer medium is directed back to the entry region of the circulating means where it unites with the heat transfer medium main stream coming out of the tube bundle reactor. Together they flow to the circulating means again. The circulating means, at the same time, functions as a mixer. Thus the cooled heat transfer medium gets into the reactor with an equalized temperature profile. Before the beginning of the reaction, however, the heat transfer medium flow through the cooler continues to be blocked by a control valve. If desired, it may even be conducted initially past the reactor through a bypass. After these preparatory measures, the process proper is realized. The control valve towards the heat transfer medium cooler is opened or closed, depending on the amount of heat generated in the reactor.

The temperature of the cooling medium in the cooler usually is predetermined, especially so if the cooler is embodied by a steam generator. An essential feature of the steam generated is its pressure. The pressure level substantially influences its further use. Moreover, this magnitude is decisive for the design of the steam piping system. As a consequence, the pressure essentially is fixed and may be varied within narrow limits only. If the steam used is saturated steam the temperature thereof results directly as a matter of fact. The temperature of saturated steam, consequently, likewise varies only within narrow limits.

The amount of heat to be dissipated in the cooler is dependent on the process realized in the reactor and fixed by it. It determines the enthalpy difference of the heat transfer medium between the inlet and the outlet of the cooler. Enthalpy is defined as the product of density, specific thermal capacity, volume flow, and temperature. While density and thermal capacity are values of substances undergoing only minor changes in the operating range, the volume flow and temperature are variable within wide ranges. Like amounts of heat to be passed off, therefore, may be achieved, for instance, by a small volume flow and a great temperature differential or by a great volume flow and small temperature differential. In practice, there are limitations to the difference between temperatures due to the fact that the cooling medium in the cooler is largely predetermined, as described above, especially so if the latter is a steam generator. And there are limitations to the temperature of the heat transfer medium, due to the reactor, because the heat transfer medium temperature exerts a decisive influence on the course of the reaction and consequently is fixed within a narrow range.

With this marginal condition taken into account, the cooler may be designed. Its heat transfer performance is determined not only by the mean temperature difference between the heat transfer medium and the cooling medium but also by the coefficient of heat transmission and the heat transmission surface. The coefficient of heat transmission among others depends also on the volume flow of the heat transfer medium: the greater the volume flow, the better the coefficient of heat transmission. Fixing the heat transmission surface and the mean temperature difference, therefore, determines the volume flow; or fixing the volume flow determines the heat transmission surface.

The heat transmission surface of the reactor tubes and the volume flow of the heat transfer medium through the reactor are determined in similar manner. The circulating means is designed so that it will be capable of transporting the sum of volume flows of the heat transfer medium through the reactor and through the cooler, taking into consideration pressure losses.

The above explanations give a general overview of the design work which precedes application of the method according to the invention and serve for better understanding of the invention. The dependencies described, in reality, are much more complicated. More detailed explanations thereof may be found relevant publications of design rules and regulations. Investment and operational costs are further factors of influence to be considered in the design as they result from the structure and dimensioning of apparatus and machinery. In an iterative process, it is attempted to find the optimum combination of technical and economic factors.

Summing up these considerations, it may be said that the most favorable dimensions and operating conditions depend on the circumstances of each individual case since each magnitude is dependent on a multiplicity of physical, technical, and economic relationships.

Once the design has been established of a reactor system, efforts are focussed on how to operate it with the least possible expenditure. An important regulatory factor in this context is the temperature of the heat transfer medium entering the reactor. This temperature is taken at temperature measuring points in the feed duct and in the distributing channel. Data of the temperature in the distributor channel essentially are of informative character only. The same applies to temperature measuring points disposed in the collecting channel and drain channel, respectively. Further temperature measuring points may be provided at the inlet and outlet, respectively, of the heat exchanger. These, too, will be of informative nature only and not be drawn upon for temperature regulation. They may be used in different context for checking the efficiency of the heat exchanger.

A control system proved to be especially advantageous with which the heat transfer medium temperature alone is measured at the heat transfer medium entrance into the reactor, and the volume flow throughout the heat exchanger is controlled automatically by a control valve. Additional measurements of temperatures at the exit from the heat exchanger serving, in addition, also for temperature control have proved to be unnecessary.

As far as design and operation are concerned, the instant method, applied in practice, provides volume flows through the heat exchanger in a range of between 5 and 15% based on the volume flow through the reactor shell.

11. Closing Down the Reaction and Keeping Warm the Reactor.

Depending on the kind of process, the feed gas supply is either stopped spontaneously or reduced very slowly to turn off the reaction. In general, great and abrupt variations of process parameters should be avoided because, for instance, a rapid change in loading may cause the control circuit to overreact. That may entail salt temperature variations with concomitant negative consequences for the process or the catalyst. For these reasons, they should be avoided.

For brief operational switch-off, including feed gas interruption, the temperature of the heat transfer medium salt should be maintained in order to avoid having to heat the salt again.

First of all, the feed gas supply is stopped in accordance with operating instructions from the licensor and/or replaced by a minor inert gas stream. Depending on the need for maintaining the temperature, more or less heater groups of the electrical heat-up means are switched on. The salt circulating pump remains in operation while the salt is being kept warm. If that should not be possible the electrical heat-up means, too, must be turned off. In that event the salt inlet channel to the electrical heat-up means must be constantly heated by steam to prevent the channel from becoming plugged by solid salt. This means that the steam system must be kept in operation.

12. Shutting Down the Reactor.

Cooling as well as emptying and cooling the reactor system to ambient temperature take place in analogy with the above explanations regarding the hot test.

Normal Operation, Salt in Reactor Before Start:

As an alternative to the procedures described above of start-up and shut-down of the reactor, the salt may be left in the reactor during the cooling operation. The description below relates only to the differences between the instant procedure and the one described above.

If a reactor is to be heated with salt as the heat transfer medium contained in solid state in the shell space, the temperature gas must not be introduced to flow through the reactor tubes in any other way but from the top to the bottom. This is so because molten salt which takes up a greater volume than solid salt must have a chance to expand upwardly without obstruction.

Other than that, the same method steps must be taken and the same temperature conditions be observed as with the previously described start-up procedure of a reactor with which the heat transfer medium salt, at the beginning, is in a salt tank. Likewise, it may be necessary to tighten all main flange connecting screws and also the stuffing boxes of the thermoelements once the desired temperature has been reached. As regards the start-up and performance of the process, there are no differences.

The reactor is shut down by the sequence of the method steps described, except for the fact that the salt is not discharged into the salt tank but substantially remains in the reactor system. Just before the solidification temperature is reached, however, the salt level must be securely lowered by draining, to below the lower edge of the upper tubesheet, if necessary. The direction taken by the cooling temperature gas is not restricted, in principle. If the gas is guided from top to bottom the salt solidifies from top to bottom and, as a consequence, cavities form underneath it. Therefore, it is preferred to direct the cooling gas from the bottom to the top through the reactor tubes. Then the formation of cavities is favored much less because, in the course of the process of solidification, the liquid salt at the top can follow the diminishing volume of the solidifying salt in the lower part of the reactor.

FIG. 1 illustrates a first embodiment of a reactor system for the method according to the invention. The reactor system is designed for exothermic gas phase reactions. The heat transfer medium used is salt. The principal component parts of this reactor system, shown as an example, essentially are a single-zone reactor 1, a circulating means 2, a heat-up means 3, a cooler 4, an expansion tank 5, a salt tank 6, and a gas treatment apparatus 7 for producing a temperature gas and a reaction gas mixture, respectively.

In the embodiment illustrated, the reactor 1 is embodied by a tube bundle reactor. It comprises a plurality of catalyst-filled reactor tubes 8 which form a tube bundle 9. The reactor tubes 8 terminate in sealed fashion in an upper tubesheet 10 and in a lower tubesheet 11. The tube bundle 9 is enclosed by an insulated shell 12 connected to the upper tubesheet 10 and the lower tubesheet 11. If desired, the shell 12 may comprise compensators (not shown) for accommodating thermal stresses. An upper head 13 with a gas inlet nozzle 14 spans and covers, respectively, the upper tubesheet 10, and a lower head 15 with a gas outlet nozzle 16 spans and covers, respectively, the lower tubesheet 11. A heat transfer medium in the form of liquid salt 17 flows around the space inside the shell of the reactor 1, preferably being guided through the reactor 1 by donut-type baffle plates 18 which alternate with disc-type baffle plates 19. Only one such baffle plate 19 is used in the instant embodiment. Both the interior 20 of the tube bundle and the outer space 21 inside the shell between the tube bundle 9 and the shell 12 are free of tubing.

The liquid salt 17 is conveyed through the reactor system by a circulating means 2. The circulating means 2 normally is a pump having an impeller 22, driven by a motor M, and transporting the heat transfer medium 17 in downward direction so as to avoid cavitation. The main stream of the heat transfer medium 17 is directed towards the reactor 1 through a short lower reactor feed duct 23. At the reactor, a lower distributing channel 24 divides it, and lower shell openings 25 of appropriate shape distribute the heat transfer medium 17 uniformly around the reactor circumference. If the reactor cross section is circular and the heat transfer medium 17 is guided, as described, uniformly throughout the circumference from the outside to the inside and then from the inside to the outside the shell openings 25 are dimensioned in accordance with the flow pressure so that the heat transfer medium 17 will be passed, uniformly distributed along the circumference, through the outer space 21 inside the shell of the reactor 1. Having passed the reactor, the liquid salt leaves it, in a manner analogous to its entering, through upper shell openings 26 into an upper distributing channel 27. An upper reactor discharge duct 28 leads the liquid salt back to the entry zone of the circulating means 2.

Moreover, a heat-up means 3 for the heat transfer medium is connected by a short heat-up means feed duct 29 to the lower distributing channel 24 and by an upper heat-up means discharge duct 30 to the upper distributing channel 27. If desired, the flow of salt additionally may be adjusted by a heat-up means control valve 31. It is preferred to operate the heat-up means 3 electrically (E-heater), but other types of heater also may be used.

The heat of reaction generated in the reactor 1 is dissipated through a cooler 4. In the embodiment shown, this is a steam generator communicating with the circulating means 2 through a short cooler inlet duct 32 and a short cooler outlet duct 33, thereby being connected to the reactor 1, too. The cooler 4 comprises a bundle of evaporator tubes 34 sealingly closed at both ends by tubesheets. The upper cooler tubesheet 35 is surrounded and covered, respectively, by an upper cooler head 36 and the lower cooler tubesheet 37 by a lower cooler head 38. The upper cooler tubesheet 35 is firmly connected to the expansion tank 5 by a connector casing 39, while the lower cooler tubesheet 37 is freely movable in axial direction in a cooler casing 40. Feed water 41 is supplied through a feed water duct 42 which extends through the upper cooler tubesheet 35 and terminates in the lower cooler head 38. Guided by suitable deflecting discs (not shown), the heat transfer medium flows around the evaporator tubes 34, thereby causing partial evaporation of the water inside the evaporator tubes. The steam-water mixture thus obtained passes through a riser 43 into a steam separator (not shown) where the steam is separated and fed to the steam system, while the separated water is returned to the cooler as part of the feed water.

Figure 3:
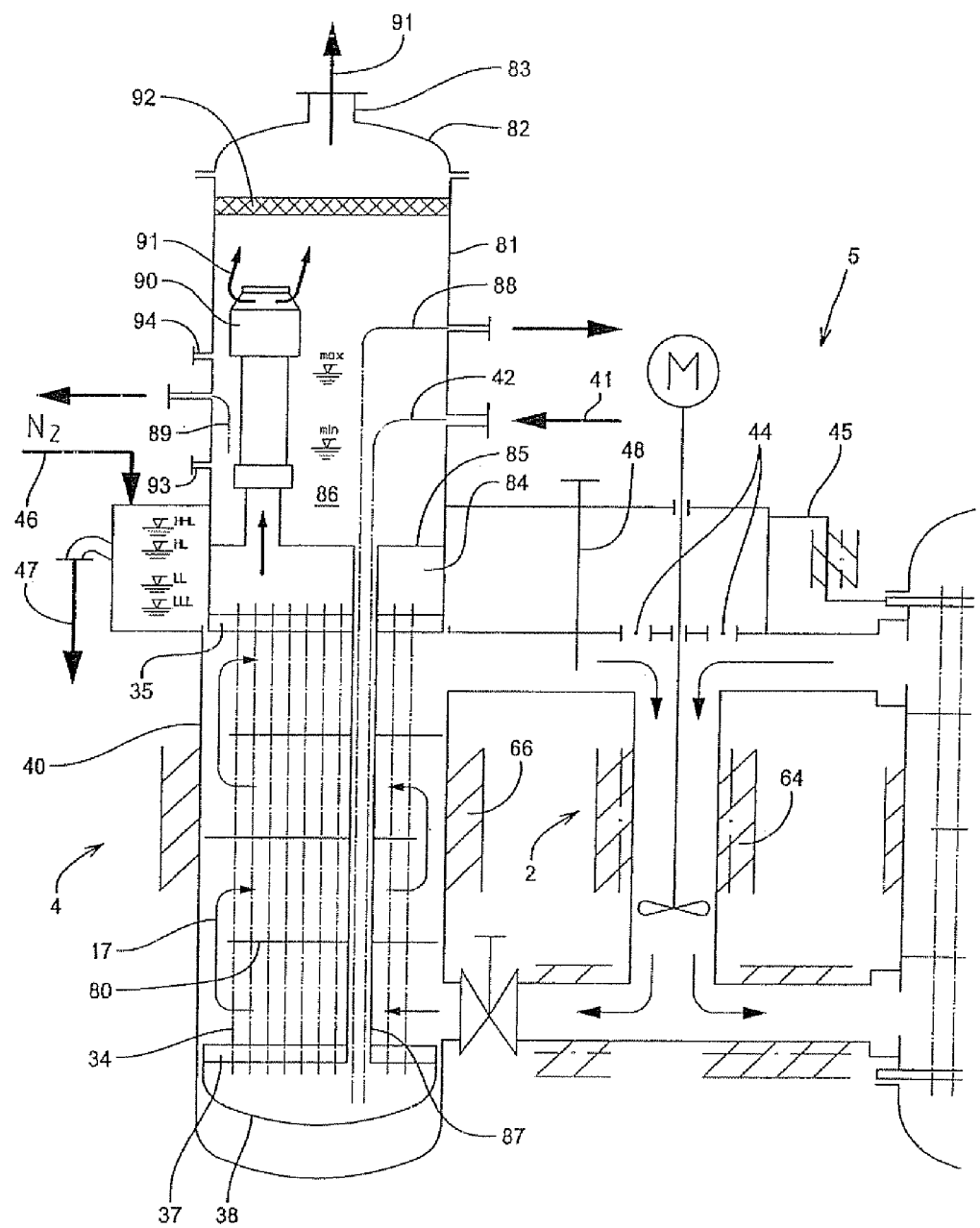
FIG. 3 is a longitudinal sectional view of the circulating means of FIG. 1, including another embodiment of a cooler.

The heat transfer medium 17 circulating in the reactor system communicates through points of connection 44, at least at one place, with an expansion tank 5. Another connection is established by a degassing duct 45 equipped with insulated heat tracing and extending between the gas space of the expansion tank 5 and a venting point at the high point or at any other points of the shell space occupied by heat transfer medium in the reactor 1. The heat transfer medium space of the entire reactor system is flushed with an inert gas, nitrogen N2, which is supplied through a nitrogen duct 46. When the capacity of the expansion tank 5 is reached, an overflow pipe 47 conducts the heat transfer medium either to a safe place which has sufficient holding capacity or directly back into the salt tank 6. In the expansion tank, the liquid level is measured by a fluid level gauge 48. At certain liquid levels appropriate measures will be released. Characteristic liquid levels are shown in FIG. 3. An overflow from expansion tank 5 means that liquid level "HL" is reached, and a warning will be given. If the liquid rises faster than it drains and the liquid level reaches the mark "HHL" the equipment will be shut down automatically. In the opposite sense, if the liquid level drops to a value below "LL" a warning will be released to call attention to the necessity of refilling from the salt tank 6. When the minimum admissible level "LLL" is reached, the equipment will be shut down automatically. Level "LLL" is situated above the lower edge of the upper tubesheet 10 of the reactor.

The heat transfer medium salt is in the salt tank 6. The salt is solid when it is filled in for the first time. Upon start-up of the reactor system it is melted either by internal heating 49 or by external heating 50 furnished with insulation. Up to this point in time the remainder of the reactor system still is free of salt. From the time on that the salt is molten and suitable to be pumped it may be carried in circulation by means of a salt tank pump 51 and a return duct 52 in order to balance and speed up the melting process. The salt tank 6 is connected to the various component parts of the reactor system by a plurality of salt connecting lines 53a, 53b, 53c, 53d. The salt connecting lines each are equipped with a respective shut-off valve 54a, 54b, 54e, 54d.

During start-up, first of all, in a gas treatment apparatus 7 a suitable temperature gas 55 is conveyed by a fan 56 to a gas heater 57 arranged in an insulated bypass of the insulated principal gas pipeline. Gas shut-off valves 59, 60, 61 serve for controlling the gas flow. The temperature of the temperature gas 55 is leveled in a gas mixer 62. At a later time, when the reactor has reached operating temperature, the gas heater 57 is shut down, the reaction gas components to be reacted are fed through a supply duct 63 for addition to the gas stream and become equalized with the gas stream in one or more gas mixers 62. First of all, however; during the heating process, the temperature gas flows through the gas spaces of the reactor 1. Heat-up is effected under conditions established by the invention as regards the time-average temperature rate of change of the temperature gas 55 as it exits the reactor tubes 8. This rate of change is averaged over a period of time which begins with the first introduction of the temperature gas and must not exceed 30° C./h. When the reactor has reached a certain temperature, the insulated heat tracing at the pump casing 64, heat-up means 65, cooler casing 66, and the insulated heat tracing (not fully shown) at interconnecting lines 67a, 67b, 67c and at connecting lines 68a, 68b, 68c, 68d to the salt tank are put into operation.

When the reactor system has been preheated to a level far enough above the melting temperature of the salt 17 and the temperature of the salt in the salt tank 6 equals the fill-in temperature for the salt, circulation controlling of the salt in the salt tank is shut down, the shut-off valves 54*a*, 54*b*, 54*c*, and 54*d* are opened, and the filling of liquid salt into the reactor system is taken up. The variation of the gas volume in the salt tank is balanced by the overflow pipe 47 and a ventilation duct 69. During filling, the liquid level of the heat transfer medium is measured by the fluid level gauge 48. When the gauge indicates a minimum fluid level, the supply of salt is ended by closing the shut-off valves 54*a*, 54*b*, 54*c*, and 54*d*, and the salt tank pump 51 is turned off. At the same time or with an offset in time, the feeding of temperature gas 55 is stopped as is the operation of the steam heat tracing, with the exception of those heater means associated with the draining and overflow pipes. The circulating means 2 and the heat-up means 3 are put into operation. Previous release of an optional shut-off valve 31 opens the way to the reactor 1 for the heat transfer medium which has been heated by the heat-up means 3. The measuring principle applied, preferably, is the procedure of bubbling-in gas, thus simultaneously covering and protecting the surface of the liquid with nitrogen, as the working gas. In addition, nitrogen may be supplied through another nitrogen duct 46.

FIGS. 2*a* and 2*b* present the reactor 1 with its main divisions and its temperature measuring points. The following components belong to major reactor portion A: the reactor shell 12, the tube bundle 9, the lower tubesheet 11, the upper tubesheet 10, and the distributing channels 24 and 27 connected to the shell 12. In this embodiment the distributing channels are annular conduits. Next to the upper end of the major reactor portion A there is a gas inlet portion 13 comprising the upper head 13 and the gas inlet nozzle 14, and next to the lower end there is a gas outlet portion C comprising the lower head 15 and the gas outlet nozzle 16.

The temperature $T_G$ of the temperature gas taken is the gas inlet temperature $T_{G0}$ in the gas inlet nozzle 14 and the gas outlet temperature $T_{G1}$ in the gas outlet nozzle 16. The reactor temperature $T_R$ at the gas inlet end is the temperature $T_{R0}$ taken of the upper tubesheet 10 at the gas inlet end, and the reactor temperature $T_R$ at the gas outlet end is the temperature $T_{R1}$ taken of the lower tubesheet 11 at the gas outlet end. Furthermore, the temperature taken of the coldest point in the reactor 1 is the temperature $T_D$ in the lower distributing channel 24.

$T_{G0}$ and $T_{G1}$ correspond to the temperatures of the temperature gas 55 as it enters the reactor tubes 8 and as it exits the reactor tubes 8, respectively, or permit these temperature to be determined. If desired, these temperatures may be taken directly. The reactor temperatures $T_R$ along the reactor 1 are taken at a plurality of temperature measuring points in at least one thermometer tube 70 arranged in the tube bundle 9. In the embodiment shown this is done at four measuring points 71*a*, 71*b*, 71*c*, 71*d*.

The distributing channel 24 at the opposite end of the gas inlet nozzle 14 is the coldest reactor part during the heat-up in phase I because the temperature gas 55 changes the temperature of the reactor 1, from the point of entry of the gas, not only in axial direction but also in radial direction. As the distance is greatest towards the lower distributing channel 24 in its exposed position that is where the coldest spot of the reactor 1 is found.

Figure 4:
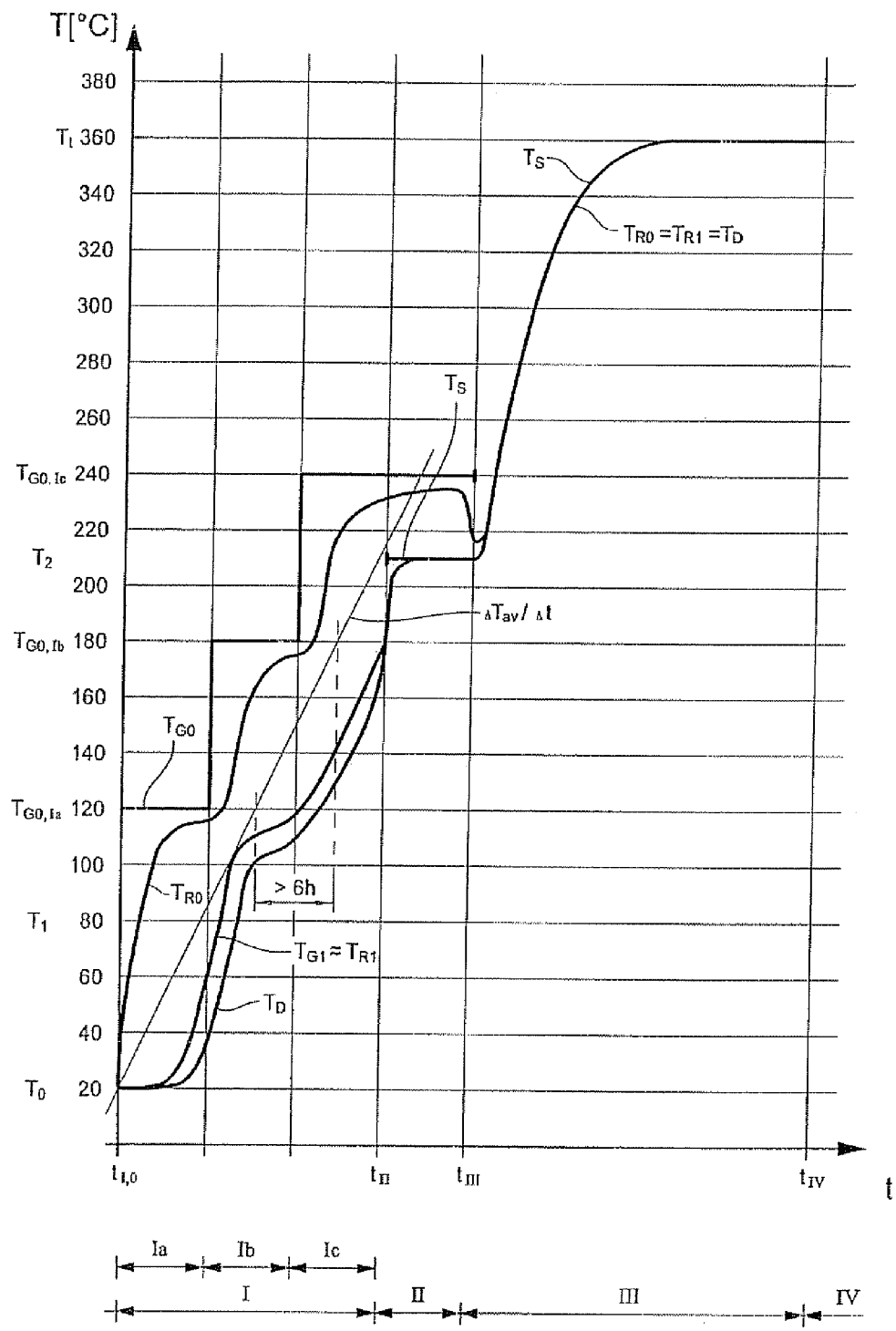
FIG. 4 is a start-up related graph depicting the qualitative course in time of the temperatures of the temperature gas on entry into and exit from the reactor, respectively, of the heat transfer medium, of the tubesheet at the entry end, and of the coldest point of the reactor.

FIG. 2*b* shows typical curves of the temperature $T_G$ of the temperature gas and of the temperature $T_R$ of the reactor throughout the reactor length L during time phase I at the beginning of the start-up (cf FIG. 4). For reasons of design and construction the temperature $T_G$ of the temperature gas 55 usually is raised in steps. In the example illustrated in FIGS. 2*b* and 4, the temperature elevation is brought about in three steps and partial phases Ia, Ib, Ic, respectively, the temperatures being $T_{G0,Ia}$, $T_{G0,Ib}$ and $T_{G0,Ic}$, respectively.

The two lower curves in FIG. 2*b* represent typical temperature behavior during partial phase Ia.

In partial phase Ia the major part of the reactor still is at ambient temperature $T_0$. In the initial region, section A1 (FIG. 2*b*), the temperature gas 55 having entry temperature $T_{G0,Ia}$, transfers heat to the reactor tubes 8. This heat transfer process does not extend as far as sections A2 and A3. From the end of section A3 onwards, the temperature gas 55 substantially has adopted the temperature of the reactor tubes 8, in other words it has cooled down to ambient temperature $T_0$ so that no further temperature variations will occur up to its exit from the reactor. The reactor 1, at the beginning of section A1, already has been heated almost to the entry temperature $T_{G0,Ia}$ of the temperature gas 55, whereas the reactor 1 still is at ambient temperature $T_0$ at the end of section A1. This shows that the heat transfer to the reactor 1 is accomplished distinctly delayed in time. The heat transfer zone or roll moves slowly through the reactor from beginning to end, as indicated by arrow W. While doing so, the temperatures and temperature differences in the reactor 1 are verified at the temperature measuring points 71*a*, 71*b*, 71*c*, 71*d*.

The upper two curves in FIG. 2*b* represent typical courses of temperatures in partial phase Ic.

At the time illustrated, the reactor 1 had been heated, until the end of section A3, almost to entry temperature $T_{G0,Ic}$ of the temperature gas 55. In the last section A4, a temperature gradient still exists between the temperature gas 55 and the reactor 1. The reactor temperature $T_R$ and the temperature $T_G$ of the temperature gas 55, respectively, at the end of section A4, at the time shown, continue to be at the levels of the corresponding temperatures in the preceding partial phase Ib, namely at $T_{G0,Ib}$. In partial phase Ic, therefore, in section A4, a transfer of heat takes place which took place similarly in partial phase Ia in section A1.

FIG. 3 is an illustration of a variant of the cooler and steam generator 4, respectively, shown in FIG. 1. Here, the heat transfer medium 17 is guided transversely of the evaporator tubes 34 by a plurality of baffle plates 80 arranged successively in axial direction. In this example, the baffle plates 80 form flow passages at a respective one of their ends each, the flow passages of adjacent baffle plates 80 being located at opposite ends. However, the baffle plates 80 also might be donut-type or disc-type as in the case of the reactor 1. Having passed through the steam generator 4, the cooled heat transfer medium 17 is returned into the inlet of the circulating means 2. The further conductance of the heat transfer medium 17 corresponds to that shown in FIG. 1 and was described in detail in that context.

As regards the evaporator tubes 34, cooler tubesheets 35, 37, and the lower cooler head 38, the evaporator part of the steam generator 4 is identical with the one shown in FIG. 1. Other than that, the embodiment according to FIG. 3 provides for the rising water-steam mixture to be separated while still in the steam generator 4 itself. To this end, a cylindrical cooler casing 81 is attached to the upper cooler tubesheet 35 and is followed by an upper cooler head 82 which includes a steam outlet nozzle 83. With this structure, the water-steam mixture generated in the evaporator tubes 34 first flows into a collecting space 80 which is closed in upward direction by a partition 85. The feed water 41 is led through a feed water duct 42 into a liquid space 86 above the partition 85 whence a cooler connecting pipe 87 will lead it into the space of the lower cooler head 38. The feed water duct 42 in part also might be extended directly into this space. A sump blow-down pipe 88 likewise extends through the connecting pipe 87 so that, if required, any deposits on the bottom of the lower cooler head 38 can be sucked off. Any floating substances having been entrained are removed by a surface blow-down duct 89.

The water-steam mixture gathered in the collecting space 84 rises through an opening in the partition 85 into a cyclone separator 90. In a demister 92 the minutest droplets are removed from the separated steam 91 which then will leave the cooler 4 through the steam outlet nozzle 83. The liquid phase runs back into the liquid space 86. The liquid level is measured by measuring stubs 93 and 94 and regulated by the amount of feed water 41 supplied. The number of cyclone separators 90 provided on the partition 85 essentially depends on the quantity of steam to be separated.

Figure 5:
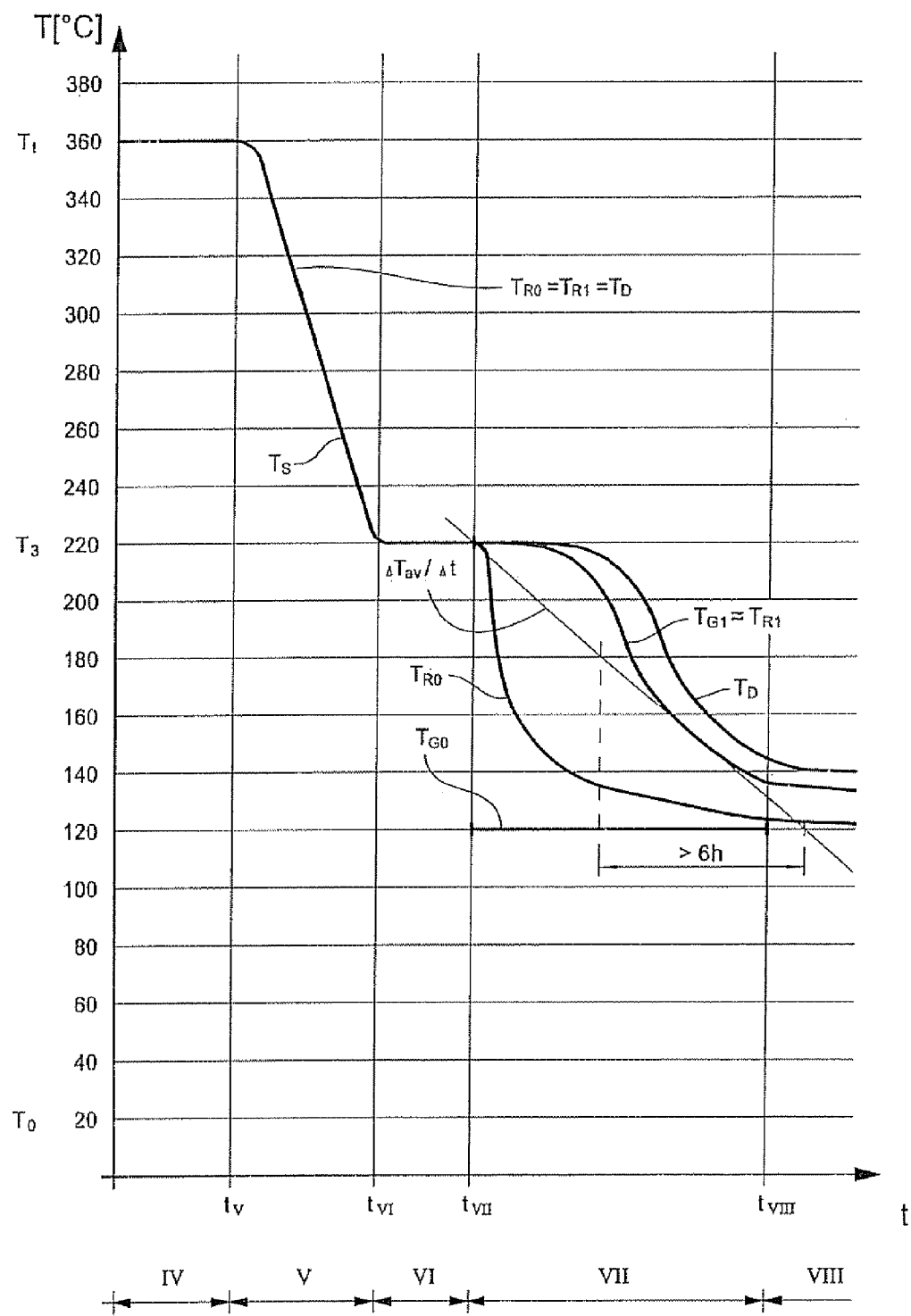
FIG. 5 is a shut-down related graph depicting the qualitative course in time of the temperatures indicated in FIG. 4.

FIGS. 4 and 5 are qualitative representations of the course of temperatures $T_{G0}$, $T_{G1}$, $T_{R0}$, $T_D$ (cf. FIG. 2$a$) and $T_S$ (salt temperature) plotted above time t, for a reactor. They cover a full circuit of start-up/shut-down, including preheating, filling in salt, heating up, cooling, and emptying of salt, subdivided into phases I to VIII. The temperatures indicated refer to operation of the reactor using "HTS" salt as the heat transfer medium. Temperature $T_{R1}$ corresponds substantially to temperature $T_{G1}$; any deviations are negligible.

Phase I illustrates preheating of the reactor system to the fill-in temperature of the salt by directing temperature gas 55 through the reactor tubes 8, the point of start being ambient temperature, assumed to be $T_0$=20° C., at time $t_{1,0}$. At a temperature $T_1$=80° C., with a deviation of ±5° C., the heat tracing 64, 65, 66, 67, 68 of the pump casing, cooler casing 40, casing of the heat-up means, the fill/drain pipelines and overflow pipes will be supplied with start-up steam. At $T_2$=210° C. and time tI1 at the end of phase I, the fill-in temperature of the salt is reached.

As explained above, the temperature $T_G$ of the temperature gas 55 in the embodiment shown is elevated stepwise during phase I. First, in partial phase Ia, as of the beginning of the start-up at point $t_{1,0}$, gas is introduced into the reactor tubes 8 at temperature $T_{G0,Ia}$=120° C., i.e. 100° C. above ambient temperature $T_0$=20° C. In the second step the temperature of the temperature gas is increased to $T_{G0,Ib}$=180° C. (phase Ib), and in the third step to $T_{G0,Ic}$=240° C. (phase Ic).

As may be gathered from the temperature curves $T_{R0}$, $T_{G1}$, and $T_D$ in phase I, the reactor 1 is heated rather quickly in the gas entry region 10, 13, 14 to the temperature $T_{G0}$ of the incoming temperature gas 55, while heating in the gas outlet region 11, 15, 16 takes place with quite some delay, even clearly delayed, once more, in comparison with the heating of the coldest spot of the reactor 1.

At the end of phase I, however, the temperature $T_D$ of the coldest spot of the reactor 1 has assimilated to the gas outlet temperature $T_{G1}$. It may be seen for all three temperatures $T_{R0}$, $T_{G1}$, $T_D$ that progress takes place stepwise, in line with the stepwise elevation of the entry temperature $T_{G0}$ of the temperature gas 55.

The diagram further contains a straight line $\Delta T_{aV}/\Delta t$ which, at $t_{1,0}$, intersects the ordinate at $T_0$ and becomes a tangent to curve $T_{G1}$ between the ordinate and curve $T_{G1}$ at the outermost point of the curve. This straight line $\Delta T_{aV}/\Delta t$ represents the maximum value of the rate of change, time-averaged in accordance with the invention, of temperature $T_{G1}$ of the temperature gas 55 as it exits from the reactor tubes 8. Each time period begins with the first introduction of the temperature gas 55, i.e. at point in time $t_{1,0}$. This time-average rate of change according to the invention must not exceed 30° C./h. In the embodiment shown it is less than 10° C./h.

During phase II, from $t_{II}$ to $t_{III}$, liquid salt 17, at a salt fill-in temperature $T_2$=210° C., is filled into the reactor system until the minimum level "LLL" (cf. FIG. 3) is reached. After the salt 17 has been filled in, nitrogen is superimposed over the salt fillings in the reactor. During this phase already, the temperature gas 55 may be taken out of operation, or it may continue to support the heat-up process.

Subsequently, as of $t_{III}$, phase III begins with the heating of the reactor system up to the desired temperature $T_t$=360° C. This phase starts with the circulating means 2 being put into operation and with the heat-up. The temperature gas 55 and the steam heating are placed out of operation, with the exception of the stubs and piping of the salt overflow, the venting, and the salt feed duct to the heat-up means 3. Excess HTS salt is discharged during the heat-up process. The heat-up process is terminated as soon as the desired temperature $T_t$ (point in time $t_{IV}$) has been reached. With the hot test, the desired temperature $T_t$ is the hot test temperature, with normal operation it is the operating temperature at which the reaction kick-off occurs in the reactor tubes 8 filled with catalyst.

In phase III, the temperatures $T_{R0}$, $T_{R1}$, $T_D$ already correspond pretty well to the salt temperature $T_S$, in other words the entire reactor 1 has become heated to the salt temperature $T_S$. In the middle of phase III the desired temperature $T_t$=360° C. is reached.

This is followed, from $t_{IV}$ on, by the steady phase IV (FIGS. 4 and 5) during which, in case the hot test is carried out, the hot test temperature is maintained for about 4 hours and the heat-up means 3 will start only in order to balance thermal losses. Or the temperature is adjusted and maintained in accordance with the desired temperature $T_t$ for normal operation.

FIG. 5 illustrates the shut-down procedure for terminating the steady phase IV.

The shut-down procedure begins with cooling of the liquid salt 17 down from operating temperature $T_t$ to the salt emptying temperature $T_3$ which, in the instant case, is 220° C. During this cooling to the salt emptying temperature $T_3$ in phase V, beginning at point in time $t_V$, the salt 17 continues to be circulated by the circulating means 2 and the reactor system is cooled by the cooler 4 to the salt emptying temperature $T_3$. During the cooling, accompanied by salt circulation, the rate of cooling is not restricted. The salt volume which diminishes during the cooling process is constantly replenished.

As the salt temperature $T_S$ becomes lower during phase V, also the temperatures $T_{R0}$, $T_{R1}$, $T_D$ of the reactor 1 at the entry into the reactor tubes 8, at the exit from the reactor tubes 8, and at the lower distributing channel 24 drop substantially undelayed. The latter is located at the greatest distance from the gas inlet region and, therefore, experiences the greatest delays in time when temperature variations caused by the temperature gas occur. The entire reactor 1 thus cools down substantially uniformly in correspondence with the cooling of the salt 17.

When the salt emptying temperature $T_3$ has been reached at the beginning ($t_{VI}$) of phase VI, the circulating means 2 is placed out of operation. The piping and the salt tank 6 are heated to prevent the salt 17 from solidifying while it drains. Thus it can exit without obstruction. The emptying procedure may begin at a higher temperature level as well, provided the salt tank 6 is designed for a corresponding temperature. Alternatively, the salt 17 also may remain in the reactor 1.

As of time $t_{VII}$, in phase VII, the reactor system is cooled to ambient temperature $T_0$. This is accomplished either by natural radiation or by blowing cooling air into the reactor tubes 8. The circulating means 2 is not operating. Cooling the reactor system with the aid of cooling air or nitrogen lasts until the temperature in the reactor system has reached the fan exhaust temperature. Thereafter the fan may be turned off.

In the embodiment shown, cool temperature gas 55 is introduced from the top into the reactor tubes 8 at the beginning of phase VII. As a result, the gas inlet region of the reactor 1 is cooled quickly, whereas the gas outlet region becomes cooler only with relatively great delay, as demonstrated by the different temperature curves $T_{R0}$ and $T_{G1}$. The coldest spot of the reactor 1 when starting up now becomes the hottest spot of the reactor during shut-down. Due to the relatively great distance from the cool temperature gas 55, the cooling takes place considerably delayed so that the respective temperature $T_D$ is distinctly higher than the gas outlet temperature $T_{G1}$ of the temperature gas 55. At the end of phase VII, the temperatures $T_{R0}$, $T_{G1}$, $T_D$ of the gas inlet and gas outlet and of the hottest spot of the reactor once again have approximated one another. The supply of temperature gas and cooling gas, respectively, 55 is stopped at time $t_{VIII}$.

In this embodiment the temperature $T_{G0}$ of the temperature gas 55 entering the reactor tubes 8 always is 120° C.

In the diagram, a straight line $\Delta T_{aV}/\Delta t$ is to be seen which intersects the (still) common temperature curve of $T_{R0}$, $T_{G1}$, and $T_D$ at point in time $t_{VII}$, at the beginning of the feeding of temperature gas, and thereafter comes to lie against the temperature curve $T_{G1}$ from below. In the embodiment shown, the straight line $\Delta T_{aV}/\Delta t$ represents the maximum value of the rate of change, time-averaged in accordance with the invention, of temperature $T_{G1}$ of the temperature gas 55 as it exits from the reactor tubes 8, the time period beginning with the introduction of the temperature gas 55 into the reactor tubes 8. Obviously, here the time-average rate of change of temperature $T_{G1}$ is much less, in comparison with the start-up situation illustrated in FIG. 4, because a much longer time period is required for a temperature change of, for example, 60° C. to be obtained. The essential thing is that this time-average rate of change of temperature $T_{G1}$ is 30° C./h at most.

Further cooling in phase VIII, from time $t_{VIII}$ on, occurs through natural heat dissipation. To expedite that, some stubs may be opened additionally.

It is possible to achieve further equalizing of the temperature differences in the major portion A of the reactor 1 during start-up and/or shut-down by putting the salt circulating means 2, 2' into operation, at least temporarily, during phases I and VII and/or VIII, respectively.

Figure 6:
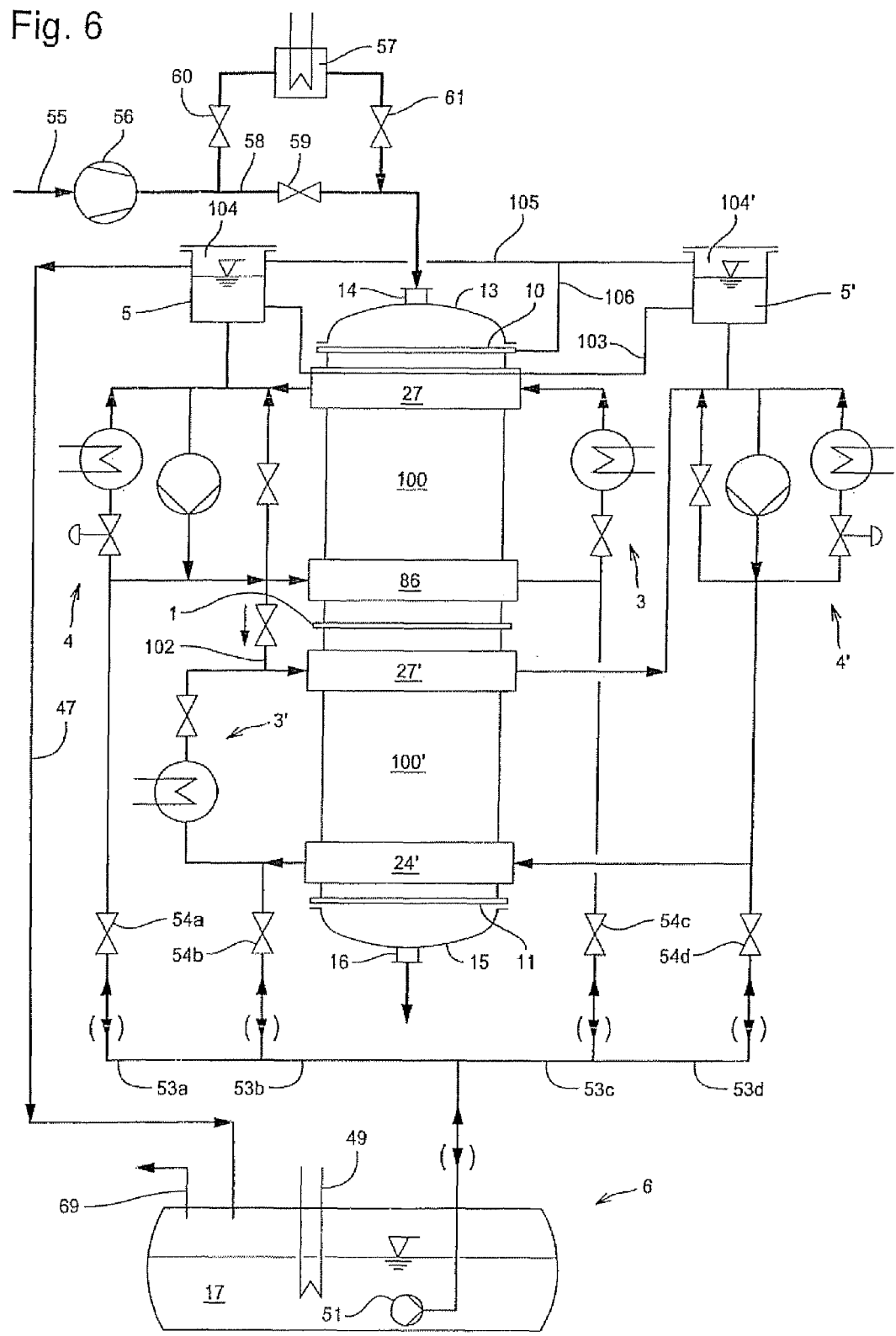
FIG. 6 is a schematic diagram of a reactor system similar to the one shown in FIG. 1, but comprising a multi-zone reactor, a second embodiment of the method according to the invention being applied to this reactor system.

FIG. 6 shows a variant of the reactor system of FIG. 1 as a second embodiment of application of the method according to the invention. While the reactor system shown in FIG. 1 comprises a single-zone reactor 1, the reactor system presented in FIG. 6 comprises a dual-zone reactor 1' whose two zones 100, 100' are separated by a partition 101. For the sake of avoiding repetitions, only alterations in comparison with the reactor system illustrated in FIG. 1 will be described below. As for the rest, reference is made to the description of FIG. 1.

The heat tracing means and insulations are not demonstrated in FIG. 6. They are, however, similar to those provided in the reactor system according to FIG. 1.

In the reactor system according to FIG. 6, each of the two zones 100, 100' has its own apparatus group of circulating means 2, 2'/cooler 4, 4'/optional bypass. A connecting line 102 links the heat transfer medium spaces in the two zones at places of different pressures. In the illustrated embodiment, these are the pressure end of the pump of zone 100 and the suction end of the pump of zone 100'. The connecting line 102 also may interconnect other points where pressures differ. Also, more than one connecting line 102 may be connected to different points. During start-up and shut-down procedures, salt may be carried through the connecting line(s) 102 from one zone to the other to balance temperature differences. In addition, expansion tanks 5, 5' are interconnected through a direct salt compensation line 103 so that, with the connecting line 102 in open state, the overflowing quantity of salt can be returned and the levels in the expansion tanks 5, 5' equalized. The expansion tanks 5, 5' preferably are arranged close to the reactor 1'. Often it is convenient to lay the direct salt compensation line 103 directly on the upper distributing channel 27. Insulation in that case is provided above the reactor 1' and above the salt compensation line 103, thereby saving separate insulated heat tracing for the salt compensation line 103. The gas spaces 104, 104' of the expansion tanks 5, 5' are connected by a gas compensation line 105. A degassing duct 106 of the reactor is connected either to the gas spaces 104, 104' of one or both expansion tanks 5, 5' or only to the degassing duct 105 of the two expansion tanks 5, 5' as FIG. 6 shows, for example.

With the embodiment according to FIG. 6 the reactor tubes 8 (not shown) extend continuously through both zones 100, 100' from the upper tubesheet 10 to the lower tubesheet 11, to both of which the respective ends of the reactor tubes 8 are sealingly welded.

The method according to the invention for start-up and shut-down of the multi-zone reactor is performed as with a single-zone reactor. In other words, the temperature of the temperature gas 55, when entering the reactor tubes 8 at the upper tubesheet 10, i.e. as it enters into the upper, first zone 100, is limited upwards during start-up and downwards during shut-down and/or the volume flow of the temperature gas 55 is limited upwards such that, for any time period which begins with the first introduction of the temperature gas 55, the time-average rate of change of the temperature gas 55, when exiting the reactor tubes 8 at the lower tubesheet 11, i.e. as it exits from the lower, second zone 100', does not exceed 30° C./h.

LIST OF REFERENCE NUMERALS 1, 1' reactor
2, 2' circulating means
3, 3' heat-up means
4, 4' cooler
5, 5' expansion tank
6 salt tank
7 gas treatment apparatus
8 reactor tube
9 tube bundle
10 upper tubesheet
11 lower tubesheet
12 shell
13 upper head
14 gas inlet nozzle
15 lower head
16 gas outlet nozzle
17 salt (heat transfer medium)
18 donut-type baffle plate
19 disc-type baffle plate
20 interior of tube bundle
21 (outer) space inside the shell
22 impeller
23 lower reactor feed duct
24, 24' lower distributing channel
25 lower shell openings
26 upper shell openings
27, 27' upper distributing channel
28 upper reactor discharge duct
29 heat-up means feed duct
30 heat-up means upper discharge duct
31 heat-up means control valve 32 cooler inlet duct
33 cooler outlet duct
34 evaporator tube
35 upper cooler tubesheet
36 upper cooler head
37 lower cooler tubesheet
38 lower cooler head
39 connector casing
40 cooler casing
41 feed water
42 feed water duct
43 riser
44 point of connection
45 degassing duct
46 nitrogen duct
47 overflow pipe
48 fluid level gauge
49 internal heating, salt tank
50 external heating, salt tank
51 salt tank pump
52 return duct
53 salt connecting line
54 shut-off valve
55 temperature gas
56 fan
57 gas heater
58 principal gas pipeline
59 gas shut-off valve
60 gas shut-off valve
61 gas shut-off valve
62 gas mixer
63 supply duct
64 insulated heat tracing at pump casing
65 insulated heat tracing at heat-up means
66 insulated heat tracing at cooler casing
67 insulated heat tracing at connecting lines between peripheral units and reactor
68 insulated heat tracing at connecting lines to salt tank
69 ventilation duct
70 thermometer tube
71 temperature measuring points in thermometer tube
80 baffle plates in steam generator
81 cooler casing
82 cooler head
83 steam outlet nozzle
84 collecting space
85 partition
86 liquid space
87 connecting pipe
88 sump blow-down pipe
89 surface blow-down duct
90 cyclone separator
91 steam
92 demister
93 lower level measuring stub
94 upper level measuring stub
100,100' zone
101 partition
102 connecting line
103 salt compensation line
104,104' gas spaces
105 gas compensation line
106 degassing duct Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What which is claimed:

1. A method of varying the temperature of a tube bundle reactor for catalytic gas phase reactions upon start up and shut down, the tube bundle reactor comprising a major reactor portion which includes a bundle of vertically disposed reactor tubes, upper and lower tubesheets tightly connected to upper and lower ends, respectively, of the reactor tubes, and a reactor shell enclosing the tube bundle, a heat transfer medium having a melting temperature in the range of from 100° C. to 450° C. flowing around the outer surfaces of the reactor tubes during normal operation and being circulated in at least one circuit through the major reactor portion, the method comprising the following steps:

(a) varying the heat transfer medium temperature by means of a heat exchanger during circulation of the heat transfer medium; and (b) passing a temperature gas through the reactor tubes for varying the temperature of the tube bundle reactor when the heat transfer medium is not circulated, wherein the temperature of the temperature gas, when entering the reactor tubes, is limited upwards during start up and downwards during shut down and/or the volume flow of the temperature gas is limited upwards such that, for any time period which begins with the first introduction of the temperature gas, the time average rate of change of the temperature of the temperature gas, when exiting the reactor tubes, does not exceed 30° C./hour, thereby limiting temperature differences occurring during start up or shut down such that inadmissible thermal stresses are widely avoided.

2. The method as claimed in claim 1, wherein the time average rate of change of the temperature of the temperature gas, when exiting the reactor tubes, does not exceed 20° C./hour.

3. The method as claimed in claim 2, wherein the time average rate of change of the temperature of the temperature gas, when exiting the reactor tubes, does not exceed 10° C./hour.

4. The method as claimed in claim 1, wherein the temperature gas is passed from top to bottom through the reactor tubes if there is a solid heat transfer medium inside the reactor shell.

5. The method as claimed in claim 1, wherein the absolute value of the difference between the temperature of the temperature gas as it enters the reactor tubes and the temperature of the tubesheet at the entry end, at any point in time, is less than 150° C.

6. The method as claimed in claim 1, wherein the temperature of the temperature gas as it exits the reactor tubes is measured directly.

7. The method as claimed in claim 1, wherein at least one thermometer tube extends within the tube bundle in longitudinal direction thereof, and the temperature is taken at least at one temperature measuring point inside the thermometer tube.

8. The method as claimed in claim 1, wherein the major reactor portion further comprises at least one upper and one lower distributing and collecting channel, respectively, which are secured to the outer surface of the reactor shell and serve to distribute the heat transfer medium entering the reactor shell and to collect the heat transfer medium exiting from the reactor shell, respectively, wherein, upon start up, circulation of the heat transfer medium begins when the lowest temperature in the major reactor portion lies at least above the melting temperature of the heat transfer medium and the average temperature of the major reactor portion lies above the melting temperature of the heat transfer medium by at least 20° C.

9. The method as claimed in claim 1, wherein all units connected to the tube bundle reactor, including a circulating pump, a heat exchanger, an electrical heat up means, and all ducts conveying heat transfer medium or being connected to the heat transfer medium side, including connecting lines, fill and blow-down pipelines, degassing ducts, and overflow pipes are heated by insulated heat tracings, unless there is an alternative heating facility.

10. The method as claimed in claim 9, wherein the temperature of the heat tracings is at least 160° C., but 250° C. at most.

11. The method as claimed in claim 10, wherein the heat tracings are operated with saturated steam.

12. The method as claimed in claim 1, wherein peripheral units connected to the major reactor portion, including casings of a pump, of an electrical heat up means and a heat exchanger are heated as soon as the tube bundle reactor has an average temperature, between inlet and outlet, which lies between 65° C. and 95° C.

13. The method as claimed in claim 1, wherein the heat transfer medium is a mixture of two or three of the salts sodium nitrite, sodium nitrate, and potassium nitrate.

14. The method as claimed in claim 1, wherein the heat transfer medium is a mixture of carbonate salts.

15. The method as claimed in claim 1, wherein the method is applied in oxidation, hydrogenation, dehydrogenation, nitration, or alkylation processes.

* * * * *